US010210481B2

(12) United States Patent
Mandel et al.

(10) Patent No.: US 10,210,481 B2
(45) Date of Patent: Feb. 19, 2019

(54) RELATIONAL PRESENTATION OF COMMUNICATIONS AND APPLICATION FOR TRANSACTION ANALYSIS

(75) Inventors: Carl Mandel, Toronto (CA); David Mandel, Los Angeles, CA (US); Brian Fudge, Del Mar, CA (US); Jack Berkowitz, Carlsbad, CA (US)

(73) Assignee: Bitvore Corp., Los Angeles, CA (US)

( * ) Notice: Subject to any disclaimer, the term of this patent is extended or adjusted under 35 U.S.C. 154(b) by 538 days.

(21) Appl. No.: 12/835,724

(22) Filed: Jul. 13, 2010

(65) Prior Publication Data
US 2011/0035681 A1 Feb. 10, 2011

Related U.S. Application Data

(60) Provisional application No. 61/262,456, filed on Nov. 18, 2009, provisional application No. 61/225,539, filed on Jul. 14, 2009.

(51) Int. Cl.
G06Q 10/10 (2012.01)
H04L 12/58 (2006.01)

(52) U.S. Cl.
CPC .......... G06Q 10/107 (2013.01); H04L 51/16 (2013.01); H04L 51/36 (2013.01)

(58) Field of Classification Search
CPC ... G06Q 40/04; G06Q 50/06; G06F 17/30994
USPC ................................................. 715/752, 764
See application file for complete search history.

(56) References Cited

U.S. PATENT DOCUMENTS

| | | | |
|---|---|---|---|
| 7,272,800 B2 | 9/2007 | Roth et al. | |
| 7,421,690 B2* | 9/2008 | Forstall et al. | 718/100 |
| 2003/0163530 A1* | 8/2003 | Ribak et al. | 709/206 |
| 2004/0260710 A1* | 12/2004 | Marston et al. | 707/100 |
| 2006/0059160 A1* | 3/2006 | Smola | G06F 17/30861 |
| | | | 705/319 |
| 2006/0173957 A1 | 8/2006 | Robinson et al. | |

(Continued)

OTHER PUBLICATIONS

International search report dated Nov. 30, 2010 for corresponding PCT application PCT/US10/42017 lists the references above.

(Continued)

*Primary Examiner* — Jennifer N To
*Assistant Examiner* — Ashley M Fortino
(74) *Attorney, Agent, or Firm* — McAndrews, Held & Malloy, Ltd.

(57) ABSTRACT

The system provides a method of sorting and presenting messages in a way so that the relationship in message threads can be easily observed and related messages can be identified. The system provides a way to view messages and map message threads and inboxes in two and three dimensions so that the content of messages can be easily reviewed and the relationship between messages can be seen and followed. The system is not limited to email messages but can present the relationship between multiple types of communications including emails, instant messages, texts, tweets, bulletin boards, wikis, blogs, voice conversations postings on social networks and other types of communications. In addition, the system allows for the inclusion of transactional information, including financial transactions, physical movement, asset deployment, or other acts or activities that may be related to, or independent of, the communications.

20 Claims, 24 Drawing Sheets

(56) References Cited

U.S. PATENT DOCUMENTS

| | | | |
|---|---|---|---|
| 2006/0276213 A1* | 12/2006 | Gottschalk | H04W 4/10 |
| | | | 455/518 |
| 2008/0082609 A1* | 4/2008 | O'Sullivan et al. | 709/204 |
| 2008/0171535 A1* | 7/2008 | Carmody et al. | 455/412.2 |
| 2008/0189633 A1 | 8/2008 | Boyle et al. | |
| 2008/0235628 A1* | 9/2008 | Faught | G06F 3/04815 |
| | | | 715/848 |
| 2009/0183096 A1* | 7/2009 | Edelen et al. | 715/764 |
| 2010/0287176 A1* | 11/2010 | Mobbs | G06F 17/30525 |
| | | | 707/765 |

OTHER PUBLICATIONS

European Patent Office, Communication with supplementary European Search Report, in European patent application No. 10800499.5-1955 / 2558947 PCT/US2010042017, dated Jul. 24, 2014. (7 pages).

* cited by examiner

RELATIONAL PRESENTATION OF COMMUNICATIONS AND APPLICATION FOR TRANSACTION ANALYSIS

This patent application claims priority to U.S. Provisional Patent Application No. 61/225,539 filed on Jul. 14, 2009, and to U.S. Provisional Patent Application No. 61/262,456 filed on Nov. 18, 2009, both of which are incorporated by reference herein in their entireties.

BACKGROUND OF THE SYSTEM

Field of the Invention

The invention relates generally to a system of sorting and presenting communications and for analyzing and tracking transactions.

Background of the Invention

Email has become an indispensable communication tool. There are a number of email applications used for sending and receiving email. Examples include email clients such as Microsoft Exchange, IBM Lotus Notes, Microsoft Outlook, Eudora, Mozilla Thunderbird, and GnuMail, and browser based email systems such as YahooMail and GoogleMail.

As email has supplemented and replaced prior communication techniques, such as posted mail, messenger delivered communication, and other physical based written communication techniques, its importance as evidence in transactions has grown. Particularly in litigation, due in part to the impact of Sarbanes-Oxley and other corporate governance requirements, the preservation and production of email is required in every jurisdiction.

The Federal Rules of Civil Procedure have been expanded to cover electronically stored information (ESI) including emails. This type of information must be preserved and produced in a controversy as well as in the normal course of corporate governance. A difficulty in producing email is the need to produce all the email required and only the email that is required of a party to produce. Failure to produce all requested email can result in potential loss of rights and/or penalties from governing bodies such as the SEC. Producing more email than is required can breach confidentiality and put a litigant or company in the position of revealing data that would otherwise have remained confidential.

In the past, the culling, sorting, inspection, and producing of all and only the correct emails has been time consuming and expensive. Prior art email systems are not designed with litigation production in mind.

Another disadvantage of prior art systems is the difficulty in analyzing non-communication transactions that may be related to communications such as email, instant messaging, texting, blogs, wilds, bulletin boards, twittering, phone calls, postings on social networks such as Facebook, My Space, etc. or other types of communication.

SUMMARY OF THE SYSTEM

The system provides a method of sorting and presenting communications such as email messages, bulletin board messages, SMS messages, Twitter messages, social network communications and other communications in a way so that the relationship in communication threads can be easily observed and related messages can be identified. The system provides a way to view messages and map message threads in two and three dimensions so that the content of messages can be easily reviewed and the relationship between messages and their senders/recipients can be seen and followed. The system allows a user to enter into a message thread at any point and to then produce a visualization of the related threads, messages, and attachments associated with each individual message. A unique tool allows the navigation of message databases with ease. The system is not limited to email messages but can present the relationship between multiple types of communications including emails, instant messages, texts, tweets, wikis, bulletin boards, blogs, voice conversations such as phone calls, postings on social networks such as Facebook, My Space, etc. and other types of communications. In addition, the system allows for the inclusion of transactional information, including financial transactions, physical movement, asset deployment, or other acts or activities that may be related to, or independent of, the communications.

DETAILED DESCRIPTION OF THE SYSTEM

The present system provides a method of maintaining and displaying relationships between communications, and of viewing these communications. In one embodiment, the system is described in connection with email communications. However, the system has equal application to any type of communications such as instant messages, text messages, tweets, bulletin boards, blogs, wilds, voice communications, social networks, financial transactions, travel and geographic location, and the like.

Figure 1A:
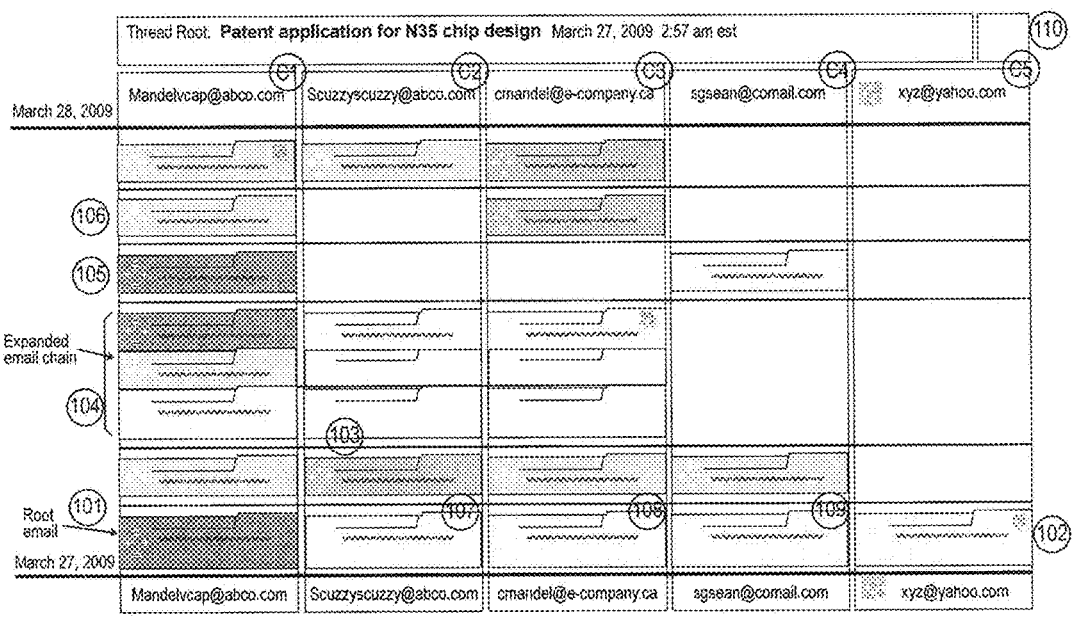
FIG. 1A is a two dimensional view of the presentation of an email thread in one embodiment of the system.
Figure 1B:
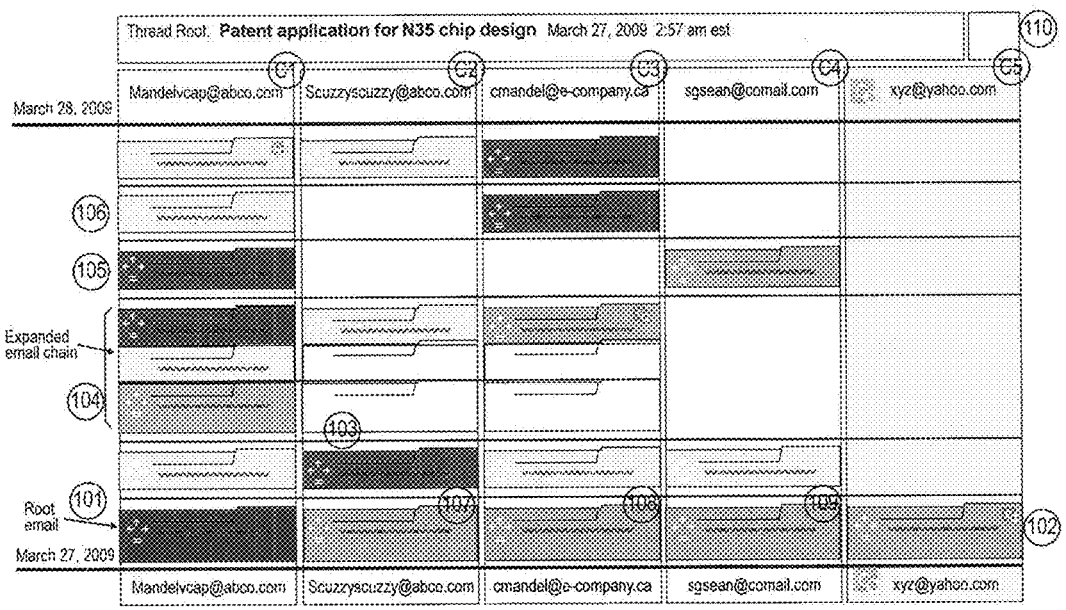
FIG. 1B is a color version of FIG. 1A.

Referring to the example of emails, as emails are created, sent, and/or received, whether as sender, addressee, cc, or bcc, the system maintains information and linkages through the various email threads. When desired, a user may display a particular email message thread in a way that can graphically represent the history of the thread and the relationship of the timing and participants in the thread. The system may use color coding to represent various actions and relationships found in the thread. In one embodiment, the system can present a thread in a three dimensional presentation to more easily allow a user to see relationships. Although the example described below is directed to email, the system has equal application to bulletin boards, blogs, social networks, SMS message strings, document revision strings, software code revision strings, web content analysis strings (such as Wiki's), and other environments where there may be one or more threads of related content or other interrelationship of content. The system may be used with other forms of interrelationships. Any form of communication or transaction can be represented and analyzed by the system. Examples of parties can be a sender, recipient, bank account and the like. Examples of objects can be: money, e-mail, bulletin board postings, social network postings, transportation, and the like FIG. 1 is a two dimensional analysis of a thread using an embodiment of the system. In one embodiment, all message threads begin with a root message that is the original message in the thread. In the embodiment of FIG. 1, the root email message is disposed in the lower left of the two dimensional presentation. (Note that the root email message can just as easily be disposed in some other location, such as the upper left of the two dimensional representation, and corresponding changes made in the ordering of the remaining messages in the thread.) The system illustrates a column for each sender/receiver participating in that email thread. In the example shown, there are five columns illustrated, but the system is not limited to this number.

Column C1 is the sender of the root message. Columns C2-C5 are columns for each recipient, cc, bcc, or forwarded recipient of the root message and other messages in the thread. The image shown in FIG. 1 is at a particular moment in time. Further activity in the thread would lead to additional messages and/or columns being displayed.

In one embodiment of the system, a root message is illustrated in a particular color (e.g. dark red) so that it can be quickly found visually. In the embodiment of FIG. 1, other messages within the same thread that are sent by the sender of the root message appear in the same particular color (e.g. also dark red). To indicate that a recipient has received a copy of the email from the root sender, a rectangular box colored in a lighter shade (e.g. light red) of the particular color chosen for the root sender is placed in the column representing each recipient, cc, bcc, or forwarded recipient (for example see columns C2, C3, or C4 or rectangles 107, 108, or 109). A "To" recipient (the named party in the "To:" box of an email) is shown in another color, a cc or bcc is shown in another color, a reply is shown in yet another color, and a forward operation in yet another color. If desired, these colors can be customized by the user as desired or may be limited to a default selection.

In one embodiment, the system defines three types of participants, root, active, and passive participants. A root participant is the originator of the root email and is shown in dark red. Any sub-roots (first email in a sub-thread) originated by the root participant is also shown as dark red. To indicate that a recipient has received a copy of the email from the root sender, a rectangular box colored in a lighter shade (e.g. light red) of the particular color chosen for the root sender is placed in the column representing each recipient, whether they are a To, cc, bcc, or forwarded recipient. An active participant is any recipient that replies to a message and is shown in dark blue. To indicate that a recipient has received a copy of an email sent from an active participant, a rectangular box colored in a lighter shade (e.g. light blue) of the particular color chosen for active participants is placed in the column representing each recipient, whether they are a To, cc, bcc, or forwarded recipient. A passive participant is any recipient that does not respond to any message or create any message and is shown in light orange/tan.

In the example of FIG. 1, the participants in column C2, C3, and C4 are all active participants as they have each originated at least one message in the thread. The user in column C5 is a passive participant in the example shown. This embodiment of the system shows messages as rows in the two dimensional image of FIG. 1. In other words, the root message 101 is on the bottom left and the recipients of that message are shown by lighter shade red rectangles 107, 108, 109 on the same row to the right of the root message. Here the message was directly addressed (the "To:" line) to the users in columns C2-C4 and the user in column C5 was just a cc'd party. In this embodiment, a cc'd party has a cc label 102 indicated on the message instance.

The original message resulted in a reply from the user in column C2, as shown by dark blue message 103 on the second row from the bottom. This message was directed to the users in columns C1, C3, and C4, while the user in column C5 was not cc'd.

The third row up illustrates a number of useful features of the system. The top message in 104 is a reply by the root participant to the active participant in column C2's reply message 103. Looking to the right of the reply message (top message) in 104 we see that it was addressed to the user in column C2 and cc'd to the user in column C3. But in addition to representing the reply message itself, the message can be expanded to show all of the previous messages in the thread in that single location. Message 103 is shown just below the reply message (top message) in 104 and the original root message 101 is shown just below that. The system contemplates where there are a larger number in columns and rows at any message location and allows the user to gather up all of the messages preceding any message simply by clicking on the special navigation button available on each message. An example of the navigation tool 110 is shown in full on the top right of the display but it is also available as part of each message header in the table. As can be seen in FIG. 1, the navigation tool 110 only displays the possible actions in this embodiment, as the tool in column C1 lacks a "left" arrow button since there are no messages to the left of that column.

The navigation button provides new navigational options for the user. A single click on the double up arrow on the navigation button contained in an email within the thread advances the user to the next email above (e.g. the email in the thread immediately following). A double click on the double up arrow moves one email down from the current email (e.g. next older). Clicking on the left arrow or right arrow allows the user to slide left or right as desired. The equal sign may be single clicked to expand or compress a chain. In one embodiment the equal sign is toggled so that alternate clicks expand and contract. In other embodiments, a single click expands and a double click contracts.

The result is that in the table of FIG. 1, messages may appear in multiple locations depending on the actions of the navigation tool and desire of the user. This allows the user at any location to click for a presentation of the thread of messages that led to the message under review, even as those messages might appear elsewhere in the table.

The system provides navigation to select the level of detail shown for email messages in the thread analysis GUI. The system's default view can be set to any of the following three options: (i) message header only (thin rectangle bar showing just the sender and date/time); (ii) message header including Subject header line; (iii) message header, Subject line, and first two lines of text of the message. For example, suppose the system's default view is set to option (i), so that each email is represented by its message header only. A single-click anywhere on the message header reveals the Subject header line. A single-click anywhere of the message header or subject line reveals the first two lines of the text body of the message. A single click anywhere on the message expands it further to show the full text of the email body. In other words, a single-click on any email within the thread expands that email message to the next level of detail. A double-click anywhere on an expanded email message contracts to the preceding level of detail. CTRL+single-click anywhere on a fully or partially expanded email contracts it all the way to the system's default starting level of detail (in the preceding example, it would contract all the way back to showing only the message header).

Continuing with the example of FIG. 1, we see another dark red message 105 immediately above message 104. This message is a second reply to message 103 but with a different addressee, namely the user in column C4. The coloring and visual presentation of the system allows a view at a glance to see that there were two replies originating from a single message. In addition, date indicators are shown so that the timing of the messages can be seen or separated by day. Often a litigation discovery request will be date delimited, so the system allows the user to easily determine which messages fall into the appropriate time period.

Figure 2A:
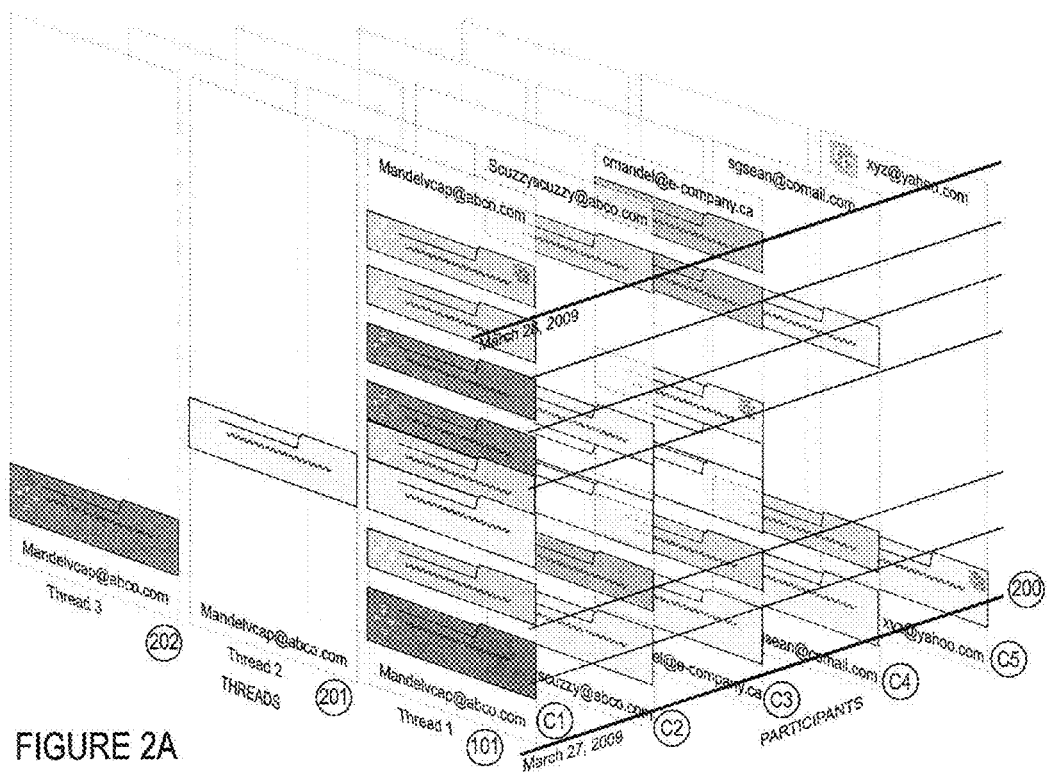
FIG. 2A is a three dimensional view containing several email threads, one of which is similar to the presentation of FIG. 1.
Figure 2B:
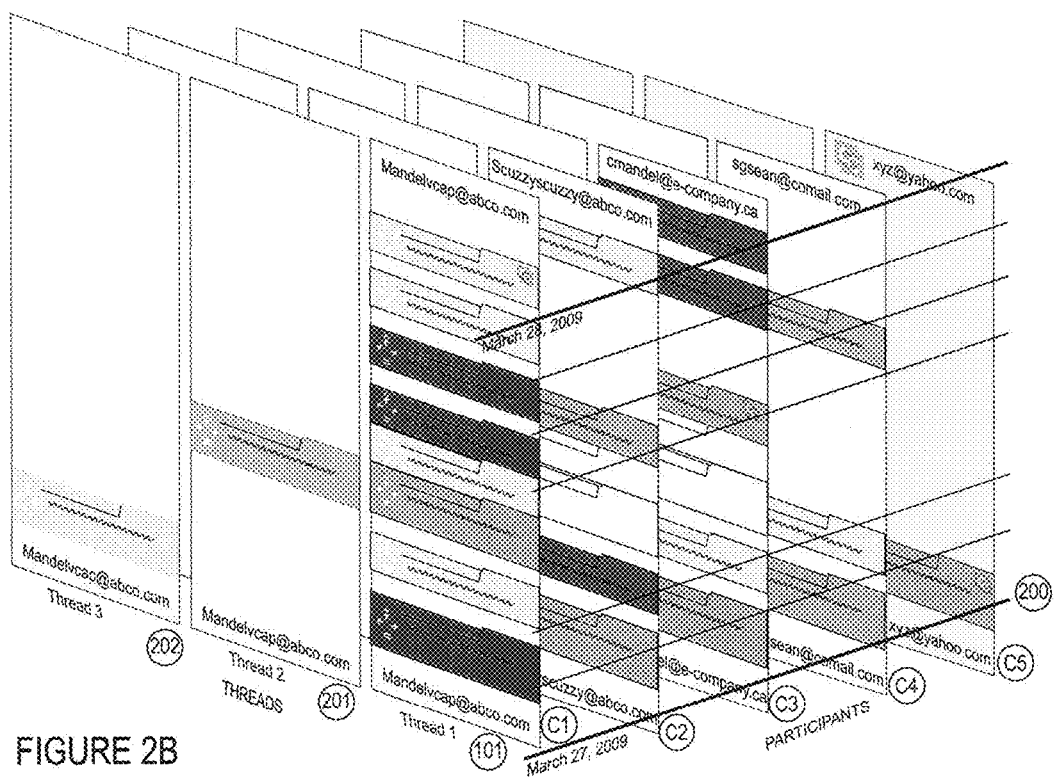
FIG. 2B is a color version of FIG. 2A

FIG. 2 illustrates a three dimensional presentation of a plurality of threads in an embodiment of the system. The thread based on root message 101 is shown in the foreground of FIG. 2 moving from front to back. Users in columns C1-C5 are shown as separate slices along the participants axis 200. Also shown in this view are other related threads 201 and 202. The user is free to click on any thread or message in the visualization and to move between a two dimensional type view of FIG. 1 or the three dimensional view of FIG. 2.

In one embodiment of the system, the user can select one or more threads or messages, both contiguous or non-contiguous, and perform a number of tasks on those selected messages, such as saving to a file, printing, sharing messages to other analysts or other desired activity.

FIG. 2 includes a horizontal slider 207 on the X axis that rotates the 3D cube about a vertical axis and a vertical slider 208 that rotates the cube about a horizontal axis. The origin (i.e. the starting message of a thread) may be in the top right corner (or any other corner or in fact in any selected position).

FIG. 2 includes the trident tool 203. A search box 204 allows the user to search for words or phrases in the data being analyzed. The embodiment of FIG. 2 also includes a region 205 with some filtering tools such as advanced search, root participants, date, and keywords that allow filtering and customization of the view presented to the user. The clipboard 206 is shown as a tabbed space in FIG. 2.

The system can provide multiple views of the 3D cube and other actions in addition to rotation can be performed on the cube. The layers may be selectively removed and/or reordered. The system can "drill down" by removing the top layer and moving further into the screen. The time, thread, and/or participant axes can be scrolled as desired. There may also be an indication of color or icon that indicates that more information is available but not presented on the screen.

Figure 3:
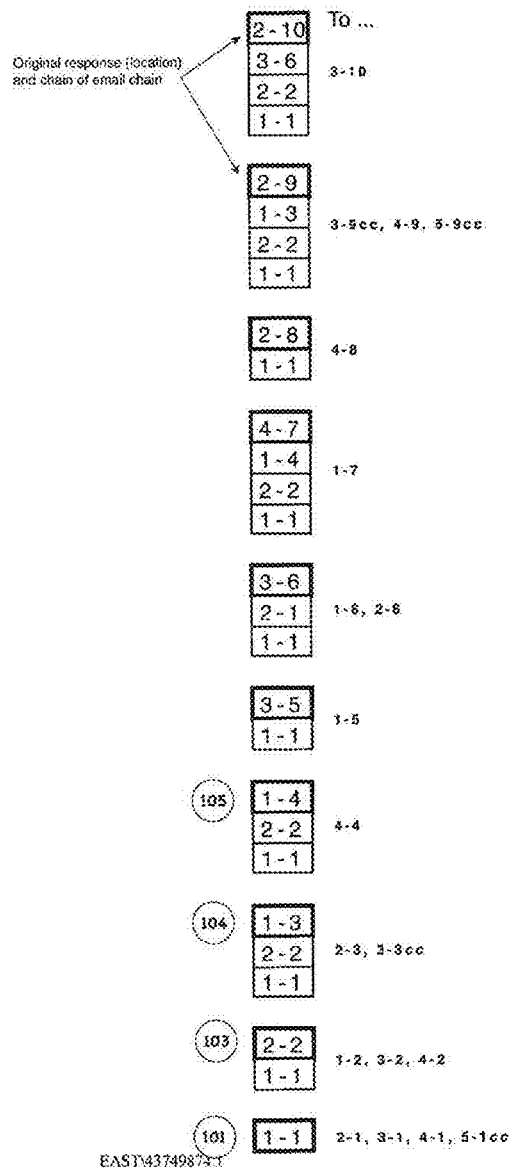
FIG. 3 is a diagram illustrating the thread analysis of the system.
Figure 3:
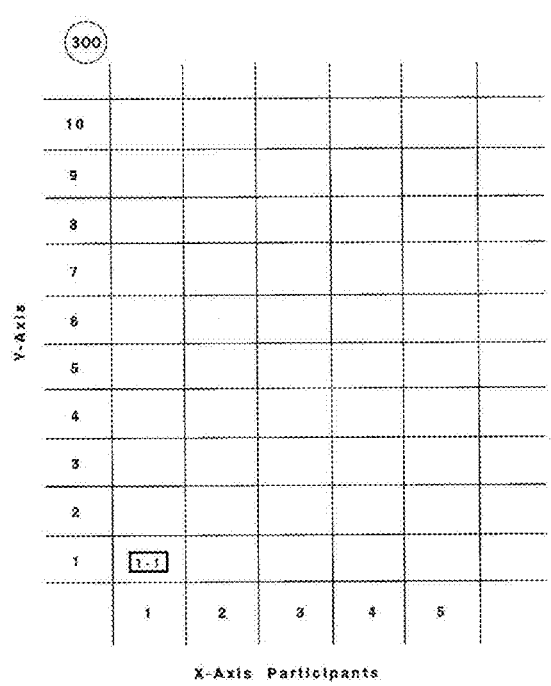

FIG. 3 illustrates a method of tracking messages and relationships in an embodiment of the system. The root message 101 is defined as message 1-1 (representing participant 1 on the x-axis (participants) and message 1 on the y-axis (relative time)). A two dimensional grid is populated based on the number of participants and can grow as the participants and messages increase.

Each message is tagged with information representing the actions taken with that message. For example, message 101 is shown with tags 2-1, 3-1, 4-1, and 5-1$cc$ indicating that the message was directly addressed to the users in columns C2-C4 and cc'd to the user in column C5. The reply message 103 of FIG. 1 is tagged as 2-2 in FIG. 3. Each reply message also tags the messages that led to that message so that they can be expanded on demand. Message 103 is tagged as 2-2 because it is sent from participant 2 and is the second message in the chain. Messages 104 and 105 show what happens when a user sends two different replies to a single message.

Figure 4:
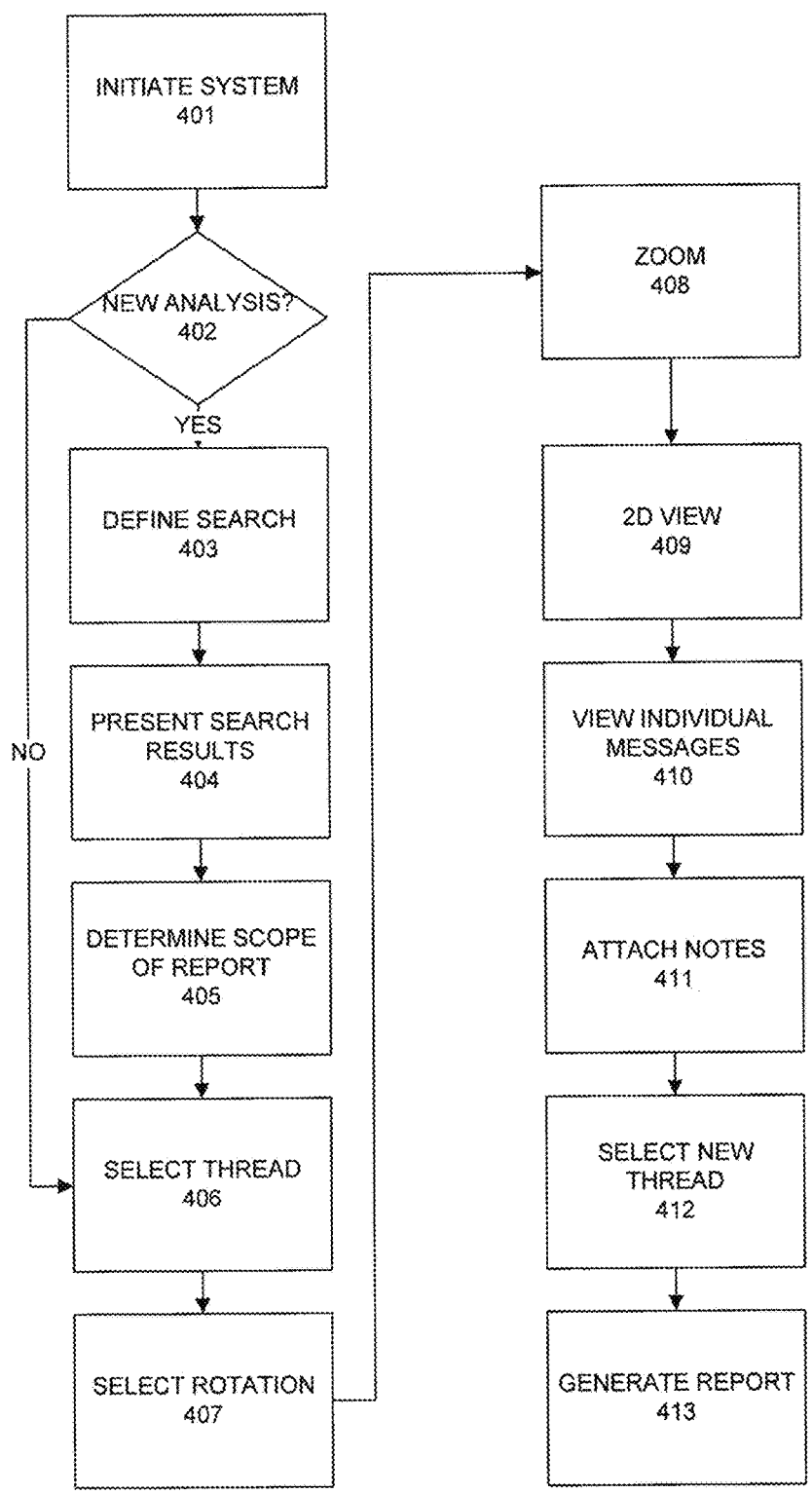
FIG. 4 is a flow diagram illustrating the operation of an embodiment of the system.

FIG. 4 is a flow diagram illustrating the operation of an embodiment of the system. At step 401 the user initiates the analysis system. At decision block 402, the system determines if it is a new analysis. If so, the system proceeds to step 403. If not, meaning that it is a pre-existing analysis, the system proceeds to step 406.

If it is a new analysis at decision block 402, the system proceeds to step 403 where the user is presented with a parameter input screen to help the user define and refine a search or analysis. The user can search for existing and saved reports or may search for specific email threads.

At step 404 the user is presented with search results and chooses one of the threads for analysis. At step 405 the user can determine the scope, parameters, tags, and/or notes to be included in a report.

After step 405, or pre-existing analysis was chosen at decision block 402, the system proceeds to step 406. At step 406, the user is presented with the main interface mode of the thread analysis system. The user can select threads from options provided in an interface. At step 407 the user can elect to rotate the display along the X, Y and/or Z axis and can select certain emails to copy to a clipboard for later retrieval. This is helpful for responding to discovery requests as the user can see a graphic representation of a thread analysis and simply select responsive emails within that view, without the need to switch to another mode for collection.

At step 408, the user can zoom into a view of any part of the cube for more detailed analysis. Even in the zoomed mode, all tools and interfaces are still available to the user. At step 409, the user is presented with a two dimensional view, as in FIG. 1. Within this view, the user can view individual emails at step 410 or attach notes to each thread and/or email at step 411. At step 412, the user can select a new thread and/or view by using an options interface. At step 413, the user can generate a report of all the emails or from previously tagged or clipboarded emails.

Information and Transactional Analysis

One feature of the system is the ability to maintain and display the relationships between communications activity and secondary information and/or other transactions (i.e. financial transactions, stock trades, travel, and the like) so that complex behavior patterns, including illicit or illegal activities, or any activities of interest, can be discovered and tracked.

There are many circumstances where it is important to know certain information such as:

1. Understand which people knew about issues when the issues occurred.
2. Understand when those people learned what they knew
3. Understand how people disseminate the information they obtained. (Such as confidential information, privileged information or information that may have been "shaped" for specific purposes by the user.)
4. Understand what people did with the information they had (such as illicit maneuvers, financial gain, and/or criminal acts).

Figure 5:
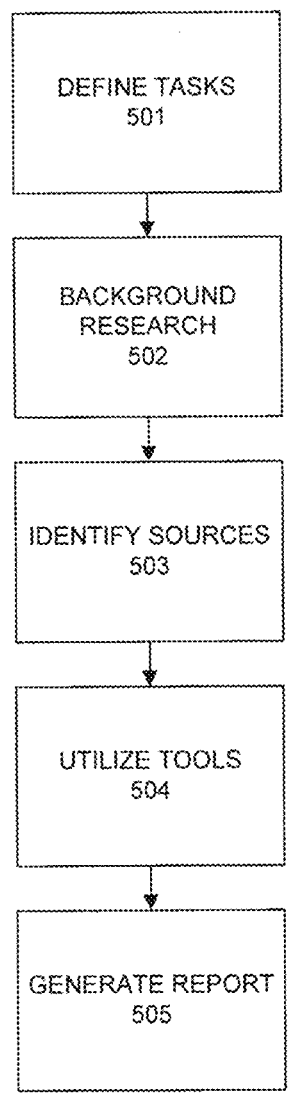
FIG. 5 is a flow diagram illustrating the use of the system for analysis.

FIG. 5 is a flow diagram illustrating the steps that an analyst would take when tracking this information. At step 501 directives and tasking is defined. This could involve indentifying individuals or entities and determining if they are participating in certain transactions. For example, the investigation could see if individual A is trading pharmaceutical stock. At step 502 background research is performed to establish possible persons and entities to be analyzed and examined as well as understand additional context. At step 503 the source of useful data is identified, such as email accounts, telephone accounts, instant message accounts, twitter accounts, bank accounts, stock accounts, social networks, etc. At step 504 the analysis tools of the system are utilized. This means that the data from the identified sources is provided to the system for display. The display can be sorted, filtered, rotated, and manipulated to reveal patterns and connections that might otherwise be hidden. At step 505 one or more reports can be generated that represent threads of communications and transactions that reveal a useful pattern. At step 506 the data, reports, and analysis can be shared with others.

The system allows patterns of communication to be revealed and associated with other behavior. There may be chains of behavior linked to email, text, instant messages and/or phone messages. The presence of a communication and a subsequent activity allows an inference that an actor in a transaction had knowledge or awareness of information prior to acting on the knowledge.

The system not only allows presentation of the communications and transactions for analysis, but allows these to be shared with other analysts. The system in one embodiment uses preparation, message processing, and visualization to accomplish the analysis.

The Preparation phase establishes "connectors" to the system. The system automatically connects to communication services such as Microsoft Exchange, voice message servers, and other communication systems. These connections can be established by direct loading onto an enterprise server or via a web-based system. Once connected, the system extracts and transforms data into a form suitable for use as well as loading the source data into a database for recall as needed.

The Message Processing phase performs semantic and metadata processing, as well as thread reconstruction, which is described in more detail below. The system will also perform de-duplication, identify and account for common users, and handle multiple email, IM, social network, and other accounts.

This visualization phase includes the visualization tools where the 2D and 3D representation of the data so that patterns can be divined. This phase also includes the filtering and sorting tools so that analysis can be enhanced. This information can be shared and reports can be authored.

When displaying the data and showing the time-based relationship between events, the system can, in one embodiment, normalize the temporal dimension. In this manner, the sequential relationships are displayed more clearly than if the temporal dimension was not normalized. When there is a large time gap between events, a display without normalization could disseminate out more than would be comfortably visible on a typical display, masking or obscuring some of the relationships that need to be seen. There are situations when the actual temporal scale is desired, to show the real time lapse between cause and effect, but the system allows the user to choose between actual and normalized temporal displays.

The 3D display of the data shows multidimensional space and allows the user to evaluate visually, using position and color, the richness of the communication. Multiple threads and multiple participants can be viewed in context with an infinite number of visual planes for analysis. The user of the system can determine which threads, which users, and can identify which planes (i.e. communication, social network, transaction) are to be included in the display. The 3D cube presentation can be zoomed, rotated, and explored in a variety of custom presentations. The zoom feature can be implemented via interface menu commands, or even the scroll wheel of a computer mouse (i.e. rolling forward to zoom in and rolling back to zoom out).

The analyst tools in working with the system include the ability to tag and apply notes to any item or plane in the display. The user can copy collections of communications, threads, and transactions to a clipboard for later retrieval. The displays, annotations, clipboards and other data can be easily shared with other analysts, exported as reports to other programs such as spreadsheets or Microsoft Word documents, and can be statistically summarized. For example, words or sentences that repeat throughout selected threads can be identified and counted to show patterns, or communication patterns statistics can be analysed.

Clipboard

Figure 8:
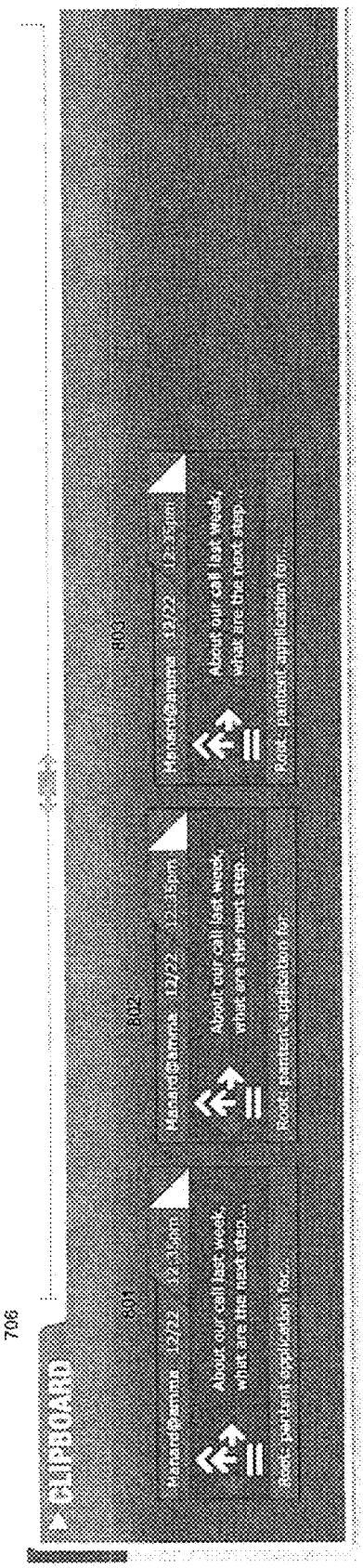
FIG. 8 shows the clipboard of the system.

The clipboard 206 of FIG. 2 is shown in more detail in FIG. 8. When expanded, the clipboard 800 shows graphical representations of data copied to the clipboard. In the example of FIG. 8, there are three elements 801-803 stored in the clipboard. Each element represents a root email of an email thread and may represent the entire string of communications and transactions associated with that root thread. Any message appearing in the 2D or 3D representation may be dragged to the clipboard. The clipboard is capable of holding a root email, a response email, a thread, a note, and any other object in the system, including transactions.

Figure 10:
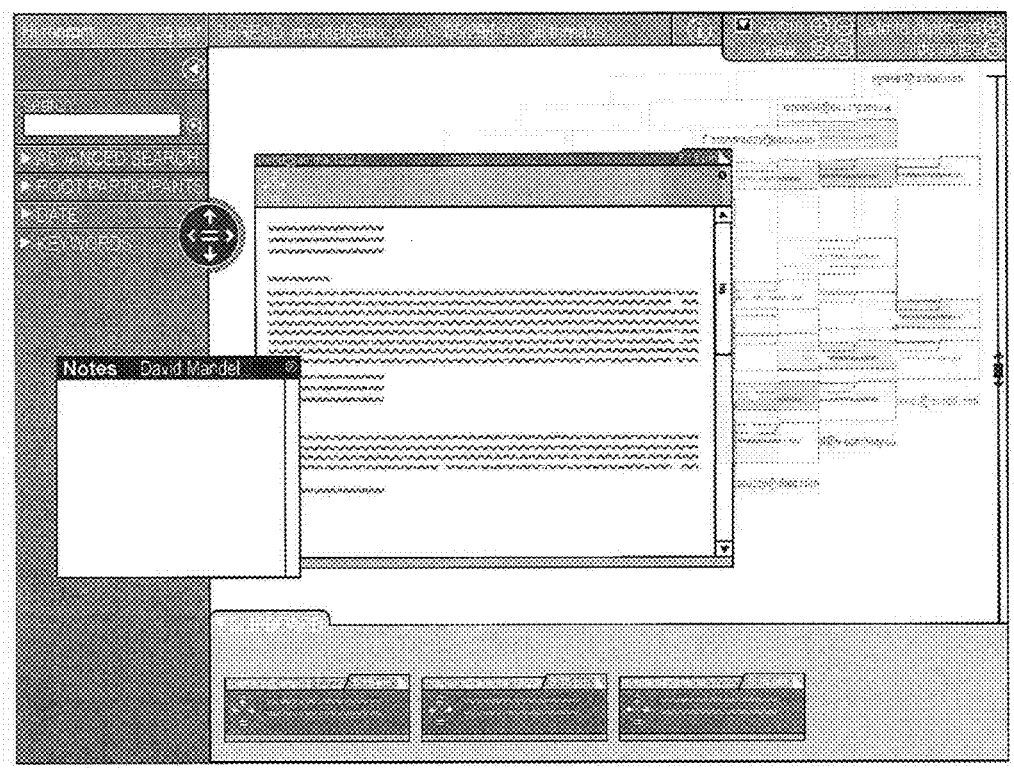
FIG. 10 is a 3D view with a message opened and a note attachment entry field opened.

FIG. 10 illustrates the 3D cube with a message 1001 selected and opened to the user (via CLICK+Trident button equal sign). (It should be noted that although the description refers to "clicks" to activate navigation events, the system is not limited to clicks but may be enabled by any type of action or event without departing from the scope and spirit of the system). The message window may be closed using CLICK+Trident button equal sign or by clicking on the red circle with an "x" inside in the upper right corner of the message window. The text of the opened message can be navigated vertically using the scroll bar along the right side. The user has enabled a note annotation entry field 1002 so that the user can attach comments about the email for later use and analysis. The text of the note can be vertically navigated using the scroll bar along the right side of the note.

When copied/pasted into a report document, or exported, the depiction can remain "live" via a web-based linkage back to the source system. In other words, for certain report formats, the reader of the report can click into the exported image area and begin to interact with the diagram as needed to rotate or otherwise view the data.

Iconography

Figure 12:
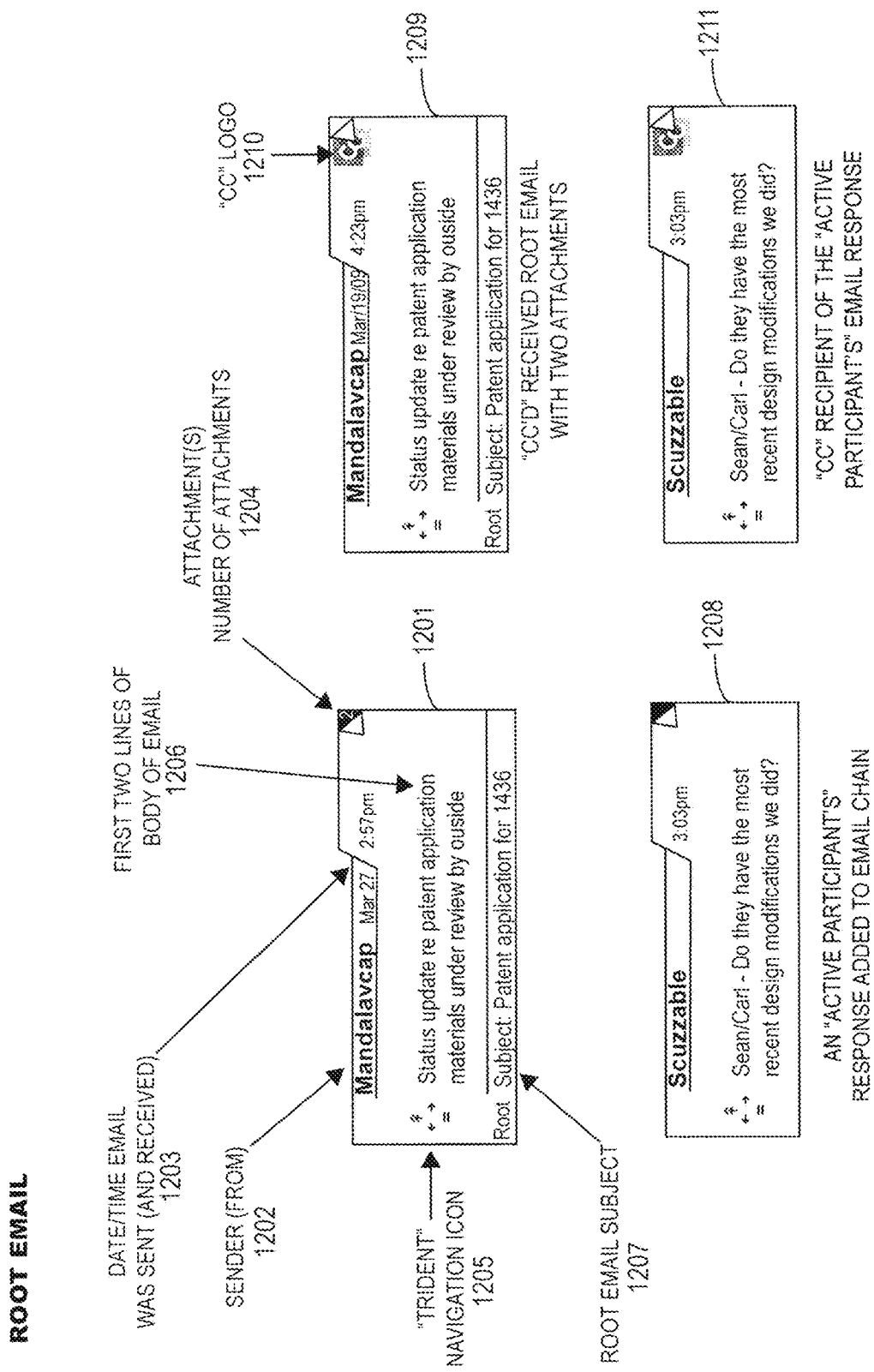
FIG. 12 illustrates the elements of email entries.

FIG. 12 illustrates the elements of email entries in an embodiment of the system. Message 1201 is an example of a sender message. The message 1201 includes the name of sender 1202, the date/time 1203, and an indicator 1204 when there is an attachment (this indication also includes a numeral representing the number of attachments). The trident navigation tool 1205 is present on each message, along with the first two lines 1206 of the message and the root subject 1207. Message 1208 is an active participant's response added to an email chain. Message 1210 is a "cc'd" received root email which in this example includes an indicator 1209 that it is a "cc" copy versus the addressee. Message 1211 is a cc recipient of the active participant's email response. These messages are color coded as noted above with respect to FIG. 1.

Description of Trident Expand/Collapse Functionality

Figure 11:
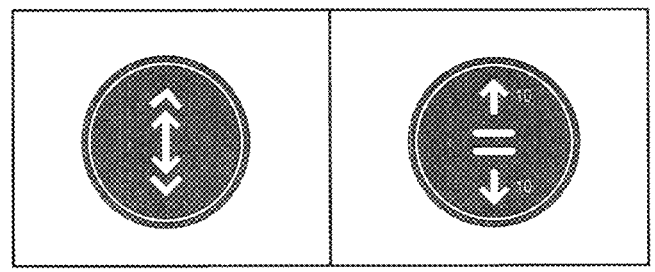
FIG. 11 illustrates embodiments of the trident navigation tool in an embodiment of the system.

The "Expanded email stack" means an email message cell that has been expanded to show all the emails up to that point in the thread; if the user has highlighted an email message within the thread, then SHFT+click on Trident button DOWN arrowheads will expand the "stack" of emails that represent the thread up until that point. The trident then would take the form of the left trident of FIG. 11

SHFT+click on Trident button's DOWN arrowheads→expand the stack to show all the emails within the chain up until that point in the thread; the emails are shown in truncated form (sender, date and Subject Header only)

SHFT+Trident button's DOWN arrowheads again→goes to the next level of detail for each message (sender, date, and Subject Header, add first 2 lines of text of the body of each email message within the stack)

SHFT+Trident button's DOWN arrowheads one more time goes to the next level of detail for each message (same as above, but add the full text body of each message within the stack)

−SHFT+Trident button UP arrowheads: contracts the stack of email messages in the reverse order to what SHFT+ double down arrowheads does.

(a possible future modification: SHFT+Trident equal sign fully collapses or fully expands the stack immediately (don't have to expand/collapse the email messages in steps).

In one embodiment, the trident tool can be adjusted to skip a certain number of threads or messages (e.g. 10 at a time) to speed up navigation through the data. This would be achieved using the CRTL+Trident UP or DOWN arrowheads and the trident would appear as on the right in FIG. 11.

Looking at FIG. 1 a user can click on the right arrow on a Trident button in email message 103 or 107 (within column C2). The corresponding action would be that the entire column to the right (C3) would slide "under" C2 and be hidden. To hide the next column (C4), you click on the right arrow again. CTRL+right arrow would expand all the hidden columns.

The left arrow has similar functionality (but for columns to the left of the column you are currently interacting with).

Thread Management

After a data set has been provided to the system, such as by importing data from an email exchange, bulletin board database or bulletin board collection system, social network database, instant messaging database, etc, the system does the following to sort, identify, and create relationships.

De-Duplication:

Go through each message in the data set and examine the Message-Id: header. Import each message with a unique Message-Id: into the database. (Although the system is described in an example using emails, the system has equal application to other communication types such as those mentioned herein).

Initial Threading:

For each message in the database, create a thread with the thread name the same as the subject of the message.

For each message in the database, examine its Message-ID: header and scan all other messages in the database for References: or In-Reply-To: headers. If a reference is found to the message-id and the messages are in different threads, join the threads by setting the thread id equal for all messages referencing the message-ID. More than one reference may be found to the message-id so more than one thread may need to be joined.

Threads with a Missing Link (Split Thread):

A split thread is when two messages in the same thread point to a third message that is missing from the database. It may be missing from the database because it was intentionally deleted or it may have been stored on a server that is not included in the dataset (messages on a partner or competitor's servers). This often occurs if a message is sent to a third party who discusses it internally and then replies.

For each message in the database, examine its References: and In-Reply-To: headers. For each of the values in these headers that do not have a corresponding Message-Id: in the database, search the database again for different messages that have the same References: or In-Reply-To: id. Join threads in which the two messages refer to the same message but are in separate threads.

After joining split threads it may be necessary to repeat step 2 of the initial threading process to join threads that could not be combined due to the missing message link.

Inferred Thread Relationships:

Some threads may still be broken after processing missing links. Remaining ways to combine threads are:

Message content analysis

Message subject collapsing

Threads with the same subject and participants:

In one embodiment, the system makes an assumption that a participant who sends two messages with the same subject within 24 hours is participating in the same thread. This may occur when someone makes an announcement to a large group, receives questions, and then issues a follow-up to the message to address those questions.

For the purposes of this analysis, subjects are considered identical after any "Fwd:" or "Re:" prefixes are removed.

Participation requirements should be tuned so that the most number of correct identifications occur with the least number of false identifications. Variables could include:

Extending time criteria to two messages within one week

Match messages with the same subject where participant matching can be sender or receiver Threads with the same Content:

Message textual analysis is complex. It compares all of the text in a message with all of the text in another message. A similarity measure is calculated, such as number of words (phrases, or sentences) matched divided by total number of words in the message. If the similarity measure exceeds a threshold, the messages are considered to be in the same thread.

This method is interesting in that it may identify connections between very unrelated threads and help understand how information is being disseminated. For instance, if an executive sends a message to managers throughout the organization describing "the upcoming project Barnstorm" these messages could be linked to threads from employees who should not have received that information.

At the same time, this method suffers from its inability to join messages that do not include the same language. This may happen if a manager sends a request to an employee asking for a timecard and the employee creates a new message with only an Excel document in it and does not include a copy of the manager's request.

System Block Diagram

Figure 6:
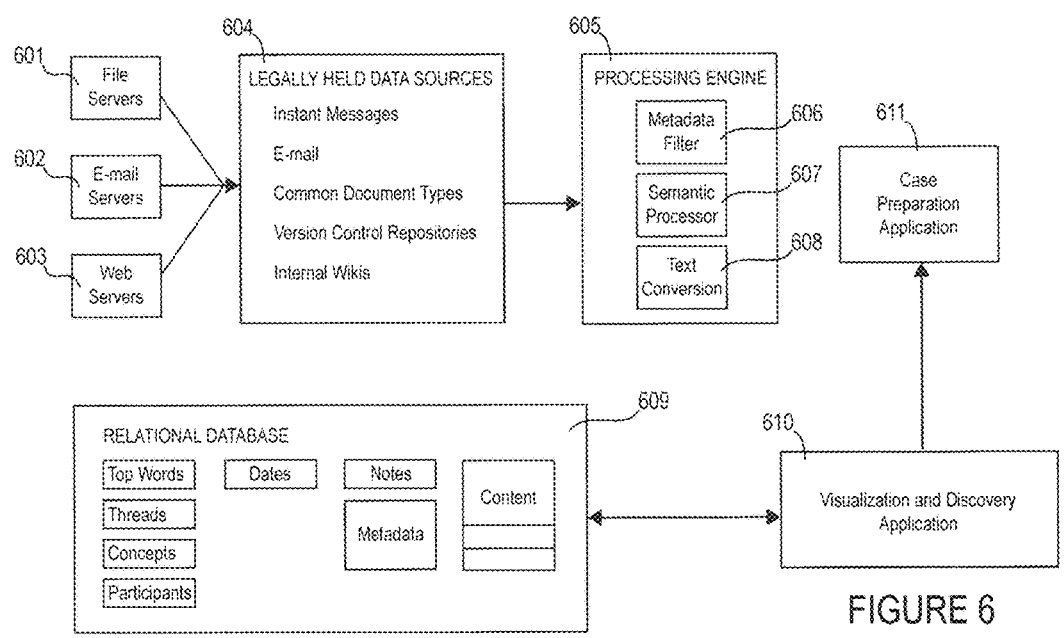
FIG. 6 is a block diagram of an embodiment of the system.

FIG. 6 is one embodiment of a block diagram of an embodiment of the system. The system obtains data from sources such as file servers 601, email servers 602, and web servers 603. These sources provide data sources 604 such as instant messages, email, common documents, version control repositories, internal wikis, social networks, etc. A processing engine 605 includes a metadata filter 606, semantic processor 607, and text conversion engine 606 to extract information and relationships from the source data and provides it to relational database 609. This data is provided to visualization and discovery application 610 that controls the display and representation of the information. This provides information to the case preparation application tool 611 for report generation, sharing, etc.

Figure 7:
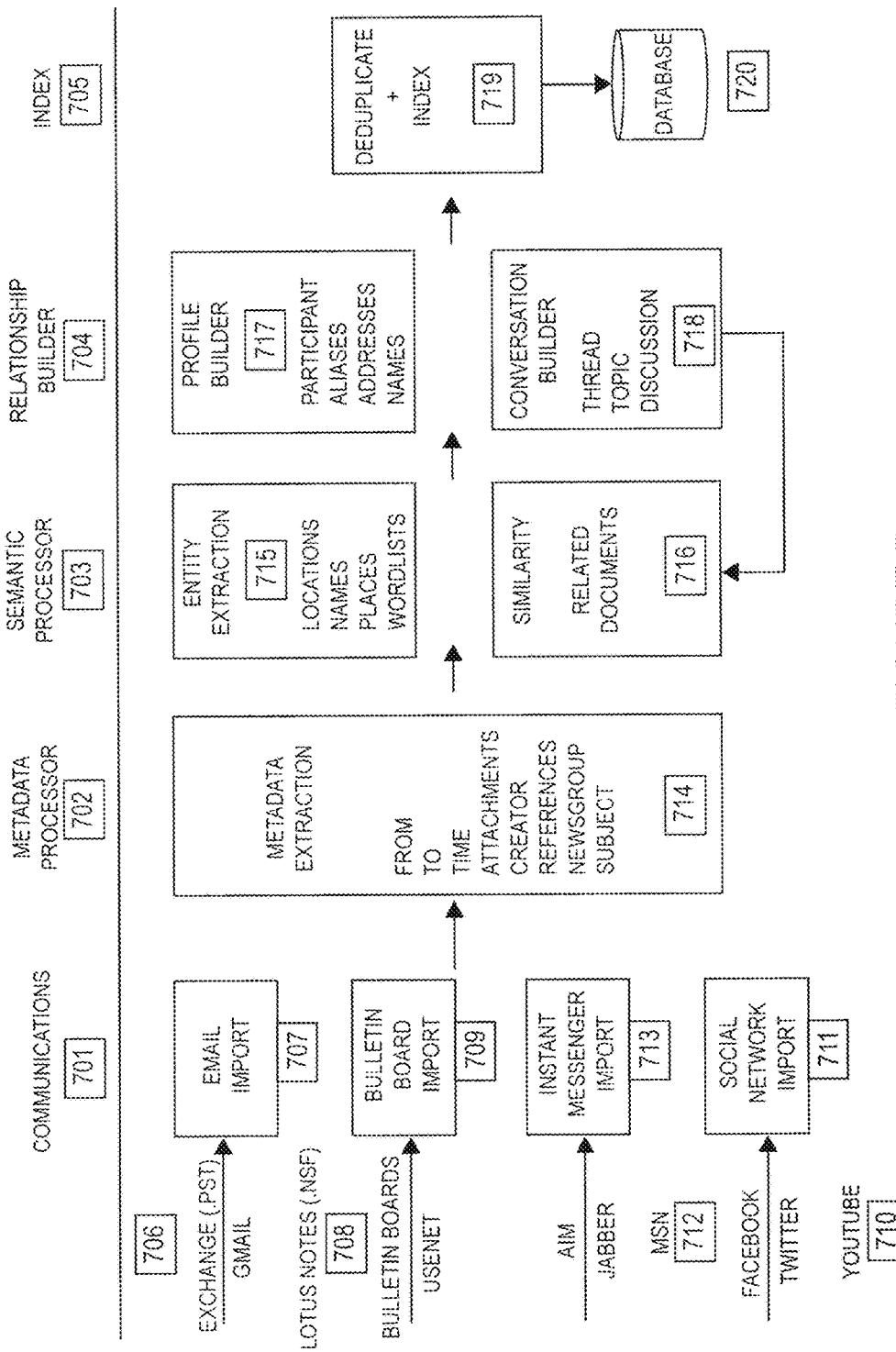
FIG. 7 is a block diagram illustrating a system for collecting data in an embodiment of the system.

FIG. 7 is a block diagram of an alternate embodiment of the system. The system operates in a plurality of stages. Stage 701 is the communications stage. Stage 702 is a metadata processing stage and is followed by a semantic processing stage 703. The system includes a relationship building stage 704 and indexing stage 705.

The communication stage 701 is where raw data is collected for importation to the rest of the system. The communication stage may take data from a plurality of sources, such as email 706 through email importer 707, BBS information 708 via bulletin board importer 709, social media data 710 via social media importer 711, and message data 712 through instant messenger importer 713.

Email data 706 may be from any of one or more email system and may be in formats such as .pst files, Gmail files, .nsf (Lotus Notes) files, and the like. The email is imported with any attachments that may be associated with the emails. Bulletin board data 708 may be messages or postings from web based bulletin boards and may come from linear or threaded (and sub-threaded) BBS sources (e.g. usenet) using bulletin board engines such as, for example, vBulletin. Bulletin board messages or postings are imported with any attachments or imbedded media such as video clips, photos, links, audio clips.

Social media data 710 may include Twitter postings, Facebook wall postings or any other message based communications on social media, such as comments to videos or blogs and associated comments. Social Media messages or postings are imported with any attachments or imbedded media such as video clips, photos, audio clips, links, etc.

Messenger data 712 includes AIM, SMS, Jabber, MSN, Blackberry Messenger, or any other instant message systems. Messenger messages are imported with any attachments or imbedded media such as video clips, photos, audio clips, links, etc.

Communications from each of these sources may be processed as a batch, or in a continuous manner as data arrives from each source, such as live monitoring of communications. Communications may also arrive multiple times or out-of-order, as they are placed in order and de-duplicated by the indexing engine 719.

The semantic processing stage 703 comprises an entity extractor 715 and a similarity engine 716. The entity extractor 715 determines locations, names, places and other noun-phrase concepts which may be optionally guided by a user defined wordlist, related to each message or communication. The similarity engine 716 uses the concepts identified by the entity extractor to identify related documents. This process conducts a search for other documents that have locations, names, places, or other noun-phrase concepts similar to the document being ingested. If the number of matching concepts exceeds a threshold the documents will be identified as similar, for use in later processing steps.

The relationship builder stage 704 includes a profile builder 717 and a conversation builder 718. The profile builder 717 identifies participants and any aliases, addresses, names, related accounts or user names, and other identifying information to identify a participant as well as possible regardless of the account that is being used. The conversation builder 718 analyzes documents to determine if they are part of a new or existing communications thread. The conversation builder uses the output of the similarity engine 716 and the techniques described herein. This process incorporates a feedback loop so that each new document added to a thread helps to identify additional candidate documents. The conversation builder 718 is helpful when responding to discovery requests by allowing appropriate responses to be identified even if the communications do not share a common subject line, thread, or topic.

The indexing stage 705 includes an indexing engine 719 to eliminate duplicates and to annotate and index each message. The indexed and processed communications and messages are stored in database 720 for later retrieval and display.

Visualization

Figure 9:
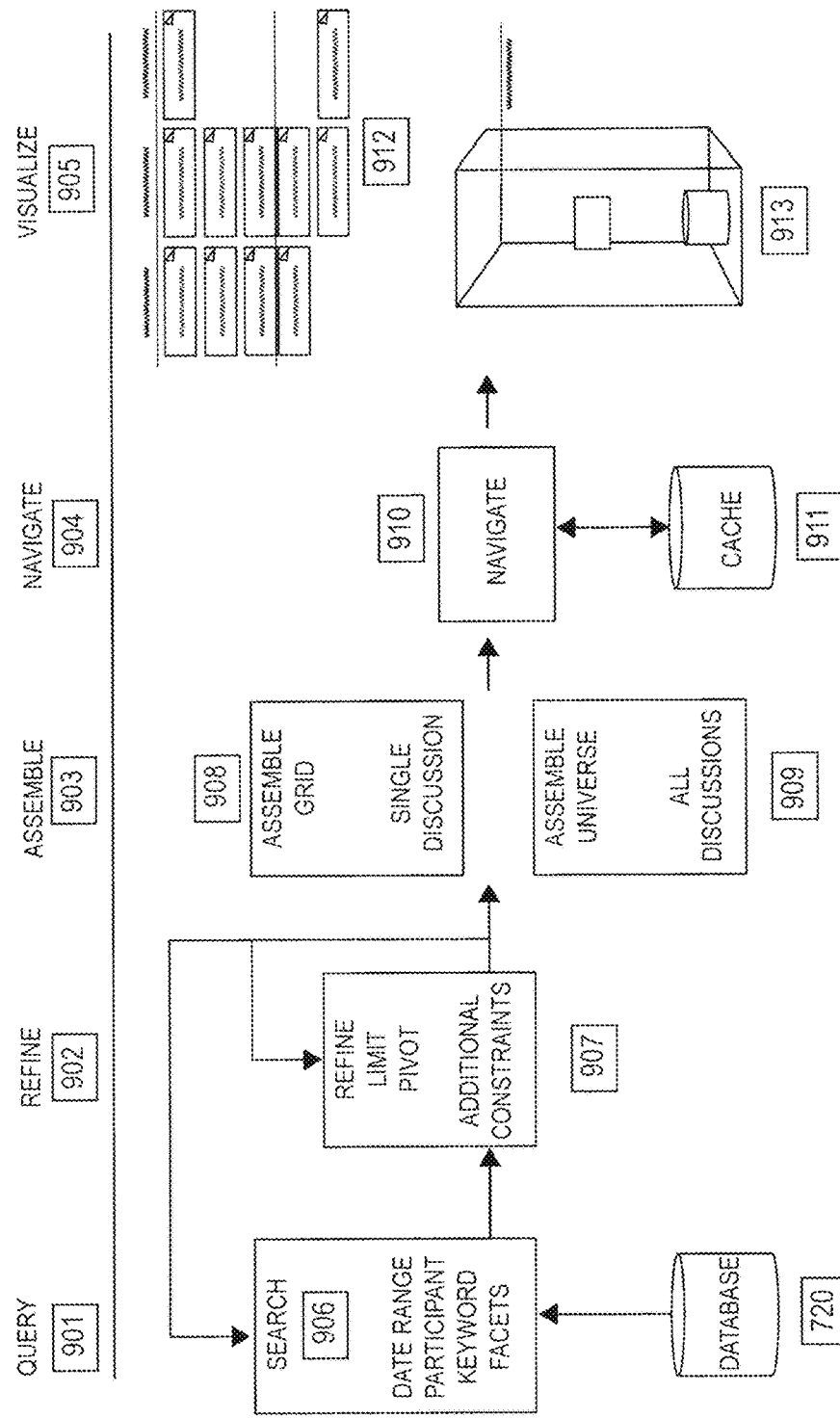
FIG. 9 illustrates a system for visualization in an embodiment of the system.

FIG. 9 is a block diagram illustrating an embodiment for generating display visualizations of data using the system. In this embodiment of the system there are a number of stage in the visualization process, including Query 901, Refine 902, Assemble 903, Navigate 904, and Visualize 905.

The Query stage 901 comprises a search engine 906 to allow specific data to be pulled out of the database 720. The search defines certain parameters such as date range, participant, keyword, and other facets of the search. These other facets can include bank accounts, locations, travel, transfers, which message sources to use, and other filtering options. The analyst will construct a search query using these limiters and advance to the refine stage 902. The search may be performed using any search capabilities offered by the search engine, such as those indicated above or semantic search, proximity search, lemmatization, Boolean operators, etc.

The Refine stage 902 comprises a Refine Limit Pivot capability 907. The Pivot capability 907 implements a pivot table which allows the analyst to select a new search based on additional concepts found in the current search. The Refine capability allows the analyst to assign each result a quality: find more like this result and show fewer like this result. The Limit capability allows the analyst to add additional constraints to the search to narrow the result set. The Refine Limit Pivot capability incorporates a feedback loop the search can be looped back multiple times as desired to refine the search and increase the confidence level of the analyst.

The Assemble stage 903 brings the data together in two ways so that the user is presented with all options upon actual display. The system uses a grid assembler 908 to generate a 2D view of the data (as in FIG. 1) and the universe assembler 909 assembles a 3D view such as in FIG. 2. The assembly typically uses a message at a starting origin point and builds the display from that point, determining position and color for each message that will be part of the visualization. In the grid assembler and universe assembler, a number of configurations for each axis are possible.

For the participant axis, in one embodiment, participants are ordered based on number of messages sent. In another embodiment, participants are ordered based on their role in the organization (executive, manager, employee) or their business unit (engineering, quality control, manufacturing). Additional embodiments allow the user to specify the technique used to order participants.

For the message axis, in one embodiment, messages are ordered based on time sent in a manner where the time between messages is preserved. In another embodiment, messages are ordered based on time sent where the time between messages is compressed. In another embodiment, messages are ordered based on a time scale that is non-aligned and resets back to 0 for each thread.

The Navigation stage 904 links the messages in the display using navigation engine 910 and cache 911 so that the trident navigation tool can be used to move from message to message as described herein. The Visualization stage 905 presents any of the possible views, for example, the 2D view 912 or the 3D view 913.

Medical Tracking

Figure 13A:
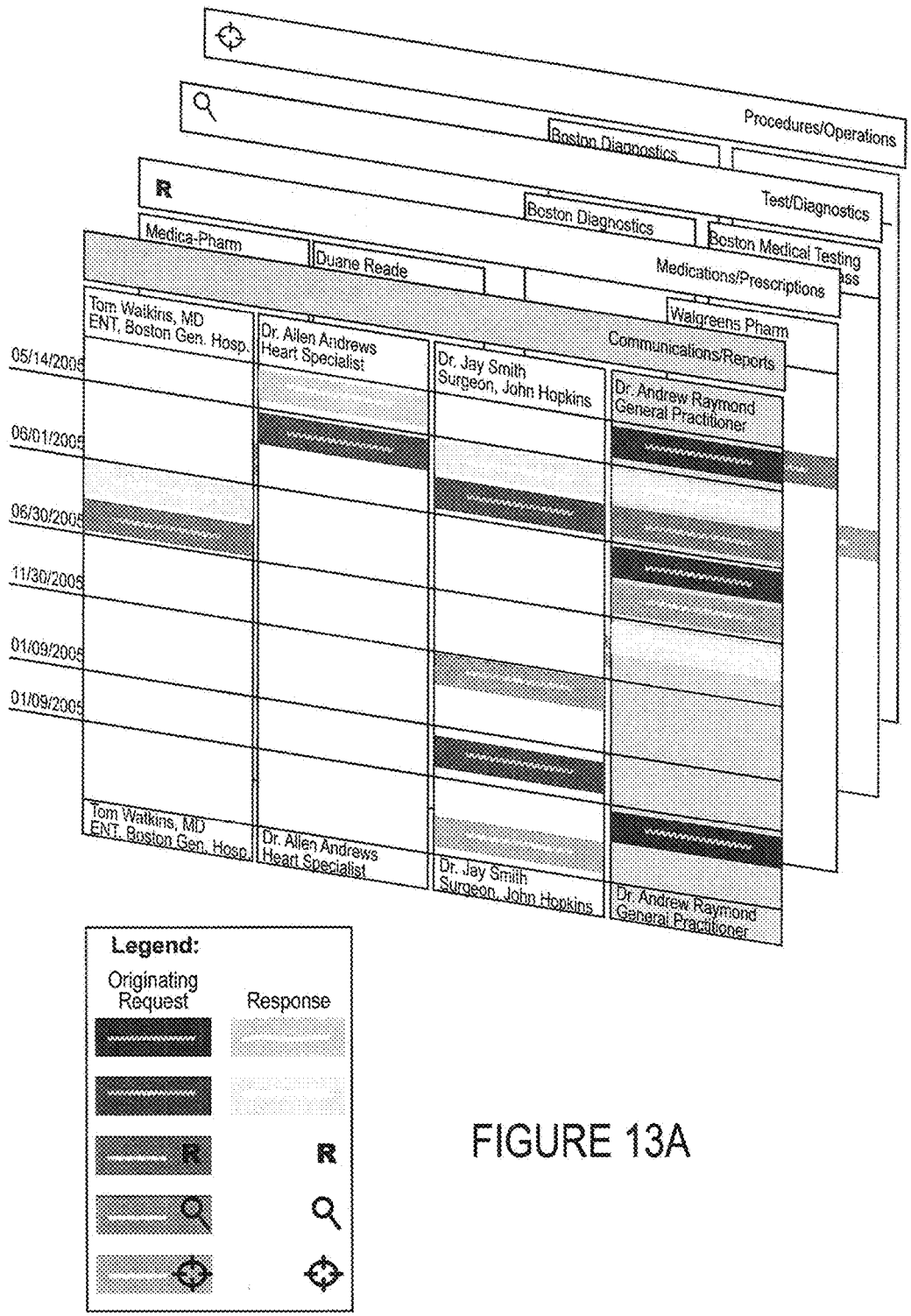
FIG. 13A is an example of medical tracking in an embodiment of the system.
Figure 13B:
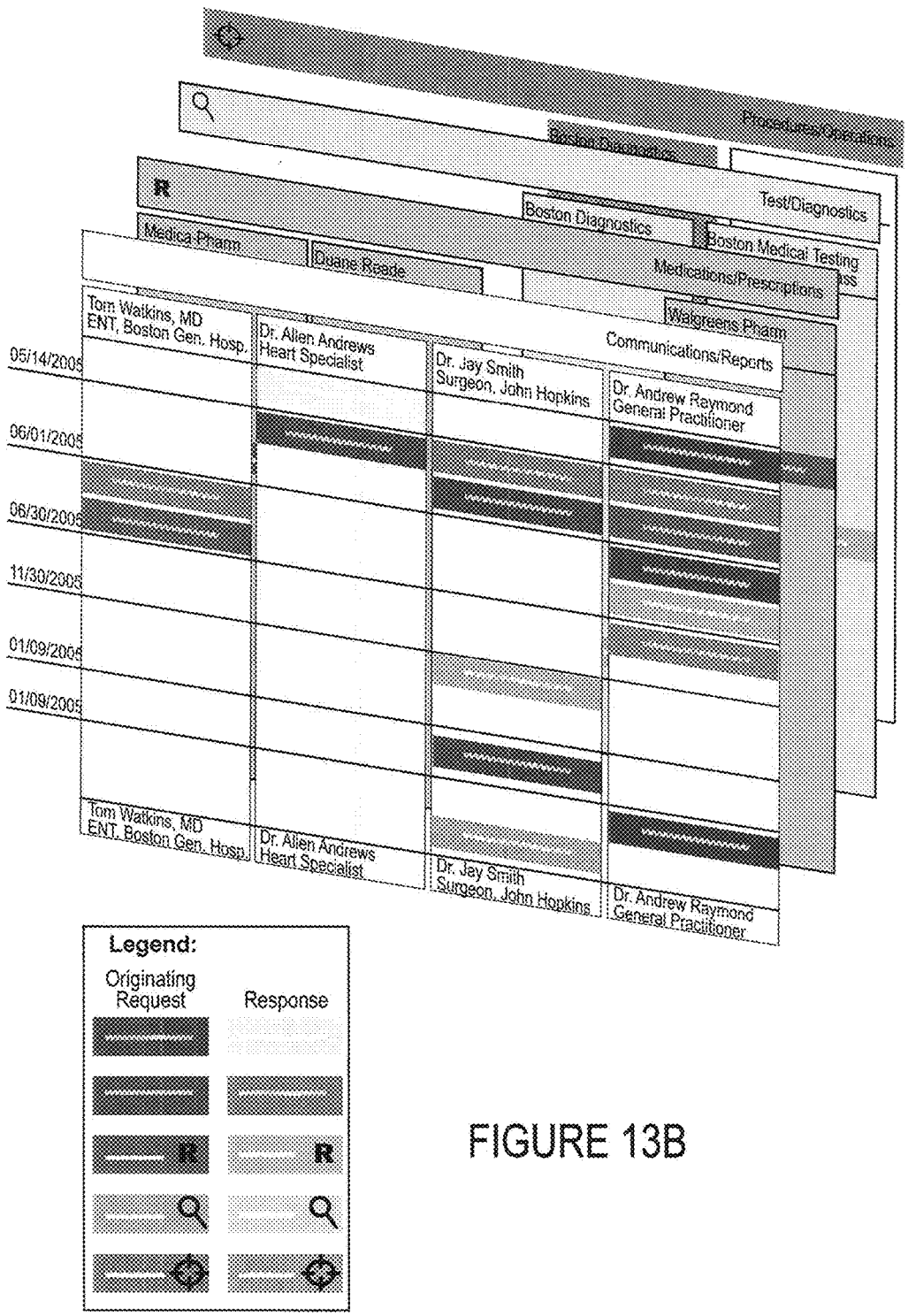
FIG. 13B is a version of FIG. 13A.

The system can be used in one embodiment for medical tracking as shown in FIG. 13. In one embodiment of the medical tracking system, each message includes at least certain information, including patient ID, participant or entity, the layer (e.g. communications, reports, prescriptions, etc.), message type (e.g. medication prescription), and the date and time. The system uses color coding or some other visual indicator to represent different types of messages in the medical tracking embodiment.

For example, the system may use a dark color to represent an originating request, and a lighter color to represent a response to that request. In addition, a plurality of types of communications are defined by particular colors. This makes it possible to see at a glance what type of communication is represented by a message in a two or three dimensional representation of data. In the example of medical tracking, red and light red represent a GP's initiating communications and responses. Dark blue and light blue represent a specialists initiating communications and responses. Dark green and light green represent meds/prescription initiators and responses. Dark orange and light orange represent test/diagnostic requests and responses, and dark purple and light purple represent procedures/operations requests and responses.

As can be seen in FIG. 13, it is possible to overlay different types of data planes that each represent a different activity in the a patient's treatment. The messages can be time normalized so that the flow of activity can be seen very easily. Selecting or clicking on any individual message will bring up all documents associated with that communication or procedure.

Financial Tracking/Intelligence

The system enables analysts to correlate communications and activities from a plurality of participants to reveal patterns and causation of events. In some cases these events could be crimes that have been committed or are in the planning stage. By presenting and correlating data from multiple sources, an analyst can track activities, communications and transactions of multiple participants.

In one embodiment, the system tracks a number of types of activity and can present each type in its own visual layer. In one embodiment, there may be a communications layer, a transactions layer, and a travel layer. This allows an analyst to see the relationship between communications, movement of funds, and location of participants.

Figure 14:
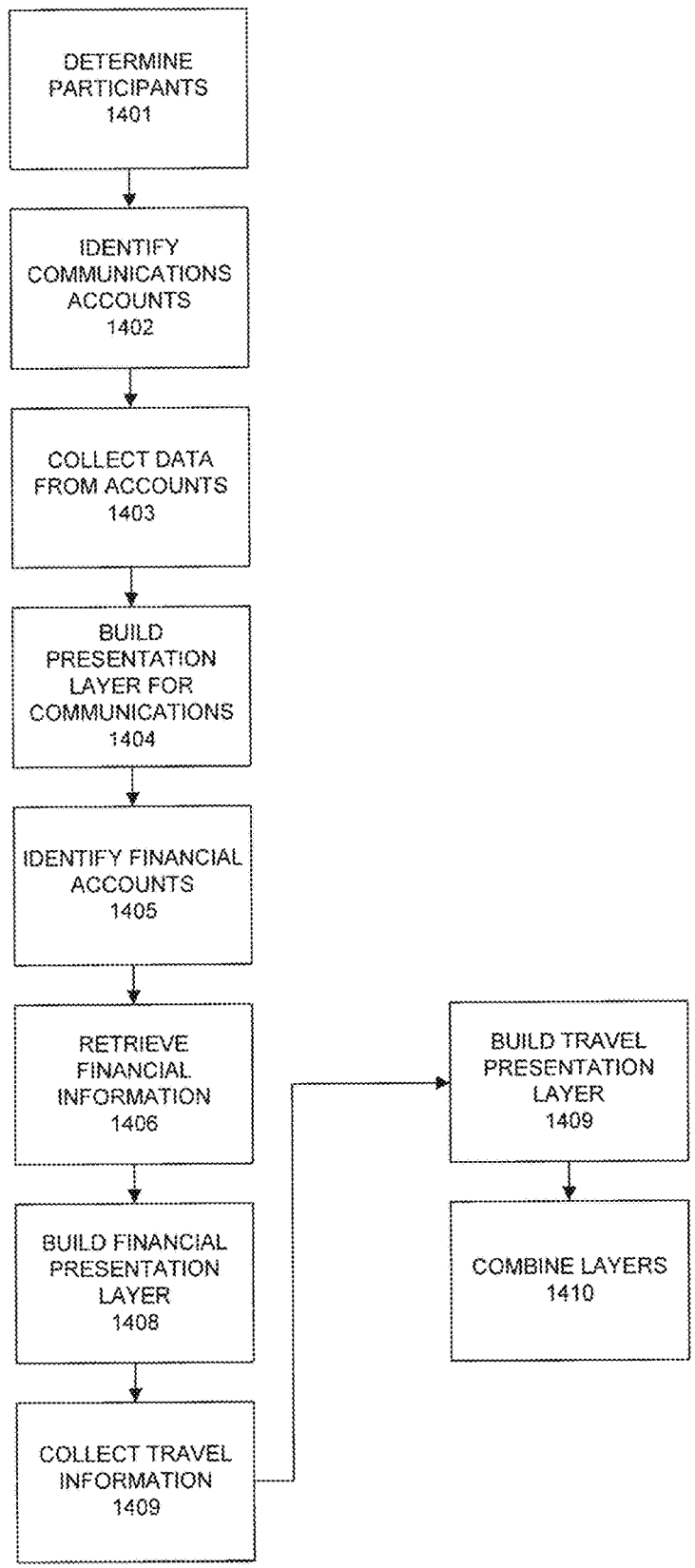
FIG. 14 is a flow diagram illustrating operation of analysis in an embodiment of the system.

The system can be described in one embodiment in the flow diagram of FIG. 14. At step 1401 the analyst determines the participants of the analysis. At step 1402 the analyst identifies the communications accounts of each participant. This may include email, SMS messaging, social media, twitter, bulletin board postings, etc. At step 1403 the system collects the communications from these sources and extracts metadata and other information using, for example, the system of FIG. 6.

At step 1404 the system builds a presentation layer for the communications of the participants. At step 1405 the analyst identifies financial accounts associated with the participants. At step 1406 the system retrieves the account information associated with the participants and at step 1407 builds a presentation layer for the financial transactions. These transactions locations and bank accounts are based on other conversations these participants are having in other threads (with their financial backers, with the leader of a terrorist cell, with other parties, and so forth). The system software assembles this information to get a confidence interval, and correlates location and funds to the discussions. The system can import bank statements and location details from external databases/sources to improve that confidence.

At step 1408 the system collects travel and geographic information for each participant (along with time/date information) and at step 1409 the system builds a presentation layer for the travel/geographic information. At step 1410 the system correlates and normalizes the layers so that they can be viewed in relationship to the overall activity of the participants. The timeline of the layers can be relative or normalized so that cause and effect can be shown more easily.

The system identifies changes in a participant's location or bank account balance, and indicate those changes in a certain color. The system identifies specific locations or amounts (i.e. Yemen or amounts greater than $2 million) and indicate those in a certain color. The system allows the intelligence analyst to program in suspicious activity flags using Boolean logic and functions, like the expression evaluator in Excel. Alerts can notify the analyst whenever there's a correlation between databases, and indicate how closely things correlate.

The following is an example to show some capabilities of the system.

Abe is the ringleader and lives in the US.

Bonnie is the money launderer and participates in the activity.

Clyde is the financing source and lives in Japan.

Darryl is the point man on the ground.

Ed leads the terror cell and is being paid to set up and detonate explosives.

Figure 15A:
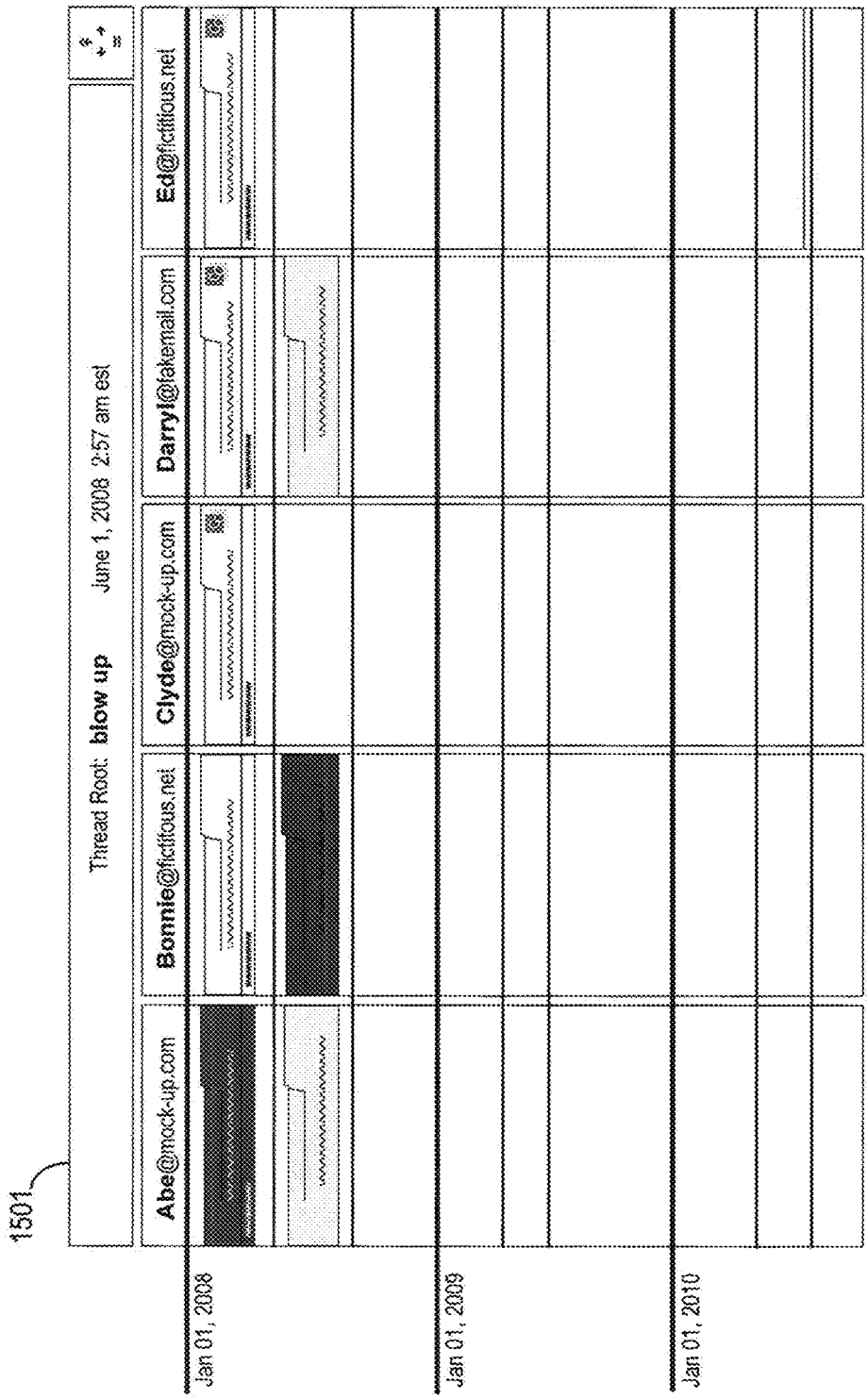
FIGS. 15A and 15B illustrate the display of analysis data in an embodiment of the system.
Figure 15B:
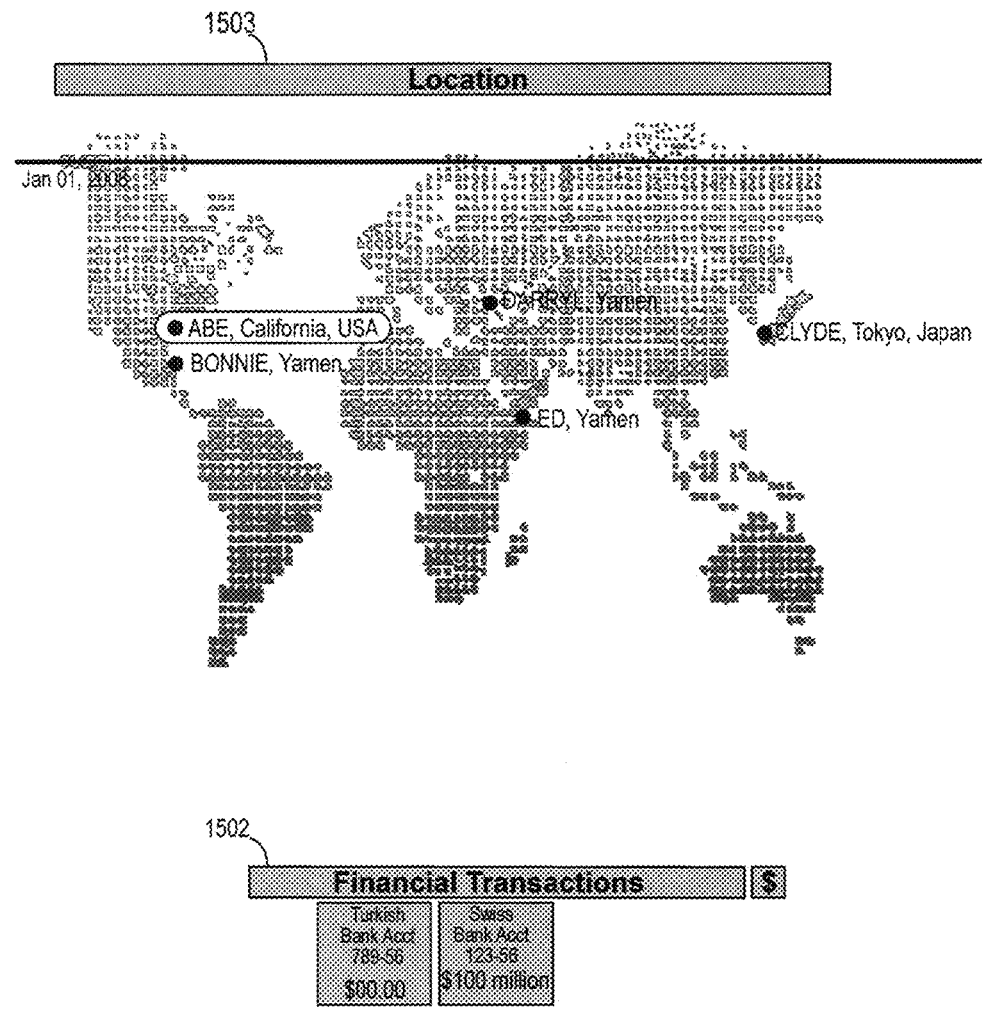

FIGS. 15A and 15B illustrate a display that shows the state of the communications 1501, transactions 1502 and geographic locations 1503 of the participants.

In the communication layer, each of the participants has their own column representing their communications. In this case, the communications have been filtered to show only those communications related to this particular plot. As noted previously, the messages may be color coded to show the nature of the message and the relationship between originator, recipient, responder, copied-to, etc. The financial transactions 1502 shows two accounts of interest. In this case, there is not direct correlation between the accounts. In other words, transactions are not made directly between the accounts, but may go through a plurality of middlemen. The system allows to show the cause and effect of withdrawals and deposits on the two accounts without the need to track the transaction through all the third parties.

The geographic indicator 1503 shows the location of a participant at the time of any particular message. By highlighting a message, the location of each participant (if known) at the time of that message is displayed in the geographic region. This display is dynamically changed as different messages are selected. The system also has the ability to "play" a scenario showing each message as it is created in time and showing the changes to the location map 1503 and financial information 1502 as the playback proceeds.

Figure 16A:
FIGS. 16A and 16B illustrate a second state of analysis data in an embodiment of the system.
Figure 16B:
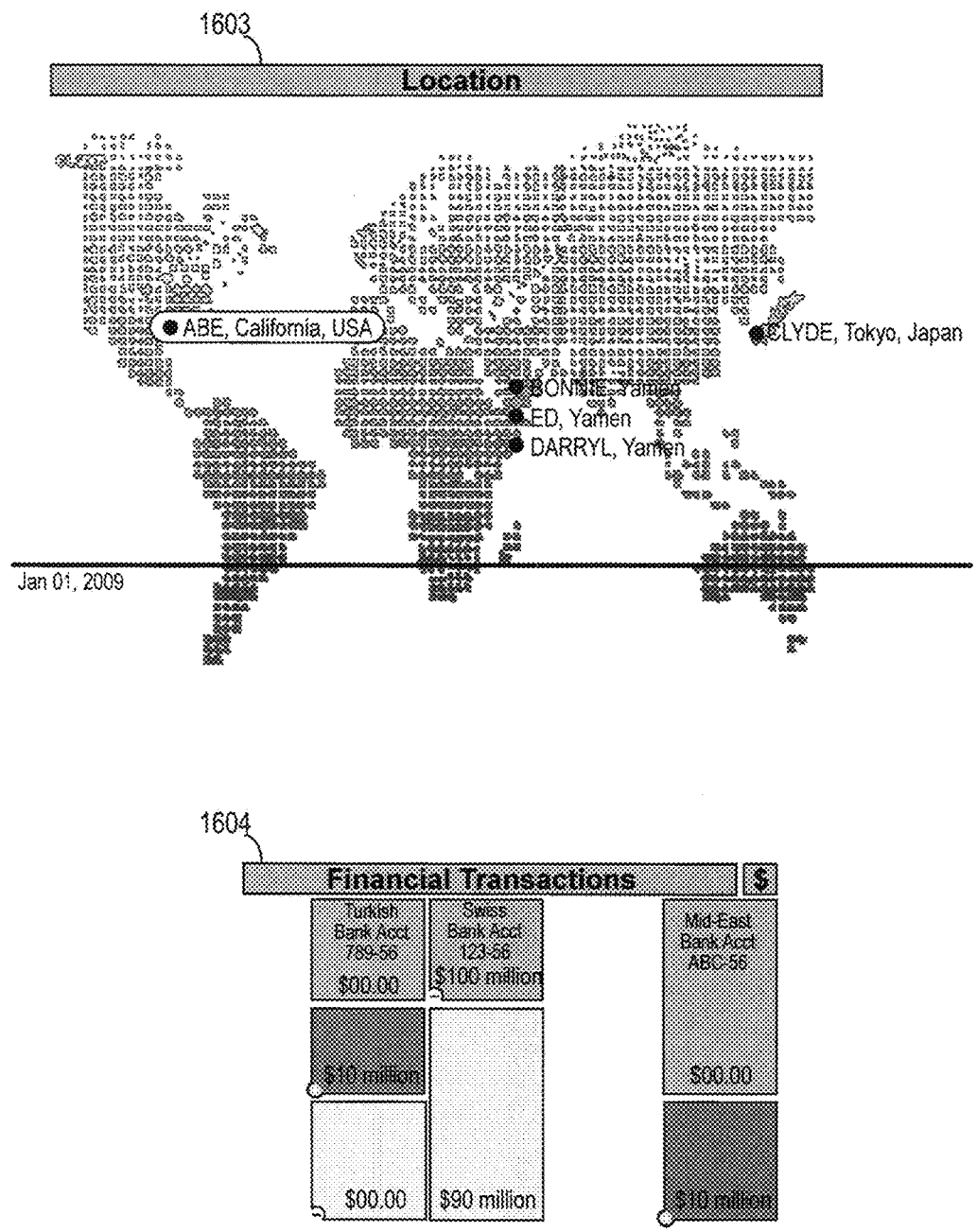

FIGS. 16A and 16B illustrate the final state of the communications 1601, transactions 1602, and geographic locations 1603 of the participants in the plot.

Figure 17:
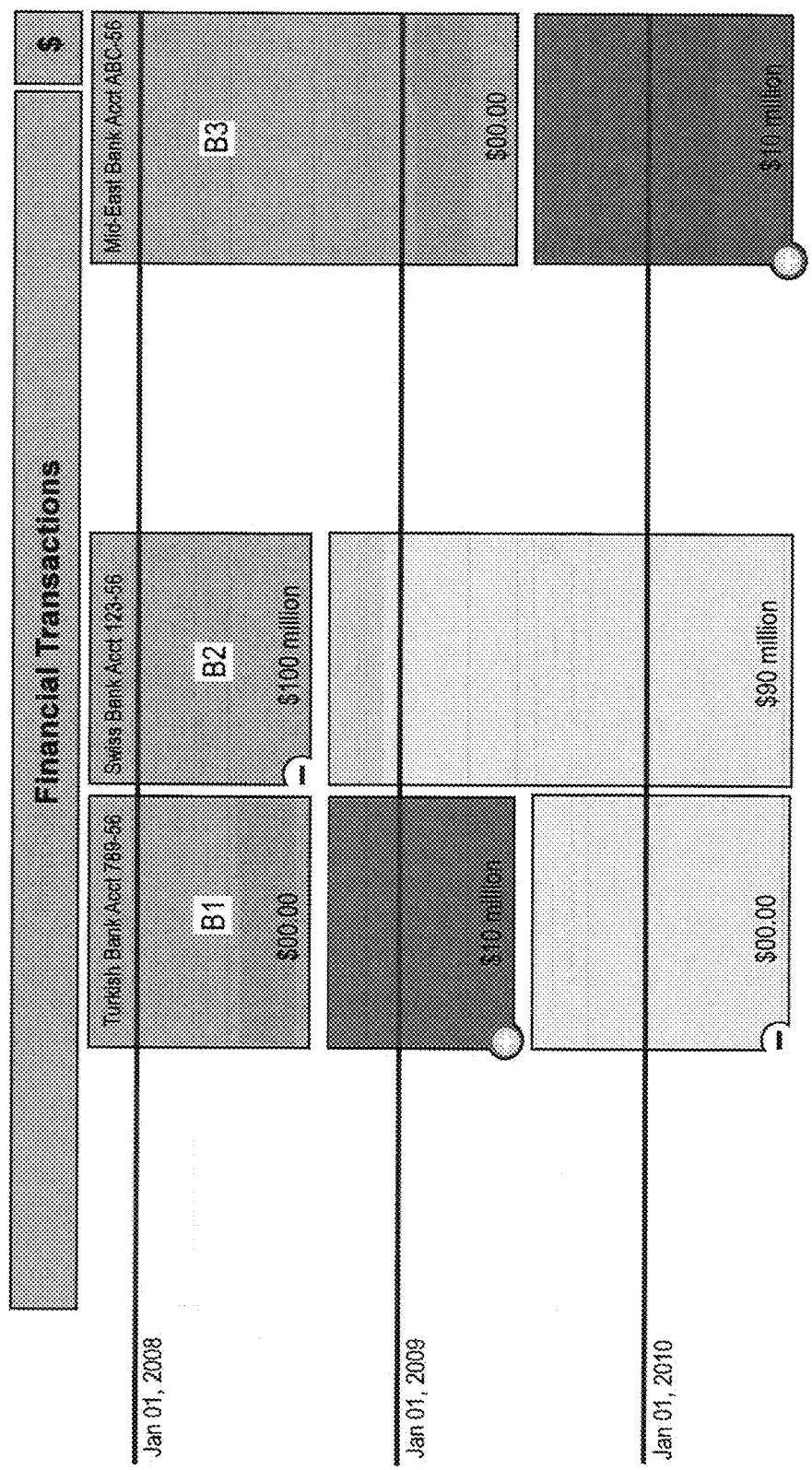
FIG. 17 is a detailed view of the transactions layer of FIG. 16B.

FIG. 17 is a detailed view of the financial transactions layer 1602. In the example shown, account B1 is a Turkish bank, account B2 is a Swiss bank, and account B3 is a Mid-East bank. The system shows the transactions overlaying the communications layer so the relationship between the transactions and the communications can be seen more easily. The system also uses color or some other visual indicator to represent the state of the accounts. In this example, medium green represents an account, dark green represents the state when funds transfer in and light blue represents the state when funds transfer out.

Again referring to FIG. 17, account B1 begins with a zero balance while the account B2 has a balance of $100 million. In response to and correlated with a communication from one or more of the participants, a $10 million withdrawal is made from account B2. This is represented by the cut-out circle on the lower left of account B2 and a visible minus sign. This is an additional visual indicator representing withdrawal in addition to the change in color of account B2 after the transaction.

Account B1 then shows a new color (e.g. dark green) and a "plus" sign indicating a deposit, also of $10 million. Meanwhile, the status of account B3 has not changed at this time and remains, for example, medium green. Subsequently, there is a withdrawal of $10 million for account B1 (shown by the circular cut-out and minus sign) and a corresponding deposit of $10 million in account B3, shown by color change (e.g. dark green) and the plus sign circle.

If there are withdrawals from an account that has already had a prior withdrawal, in one embodiment the second withdrawal is shown by a second circular cut-out or indent with a minus sign. In another embodiment, the size of the circular cut-out is enlarged to indicate multiple withdrawals. In yet another embodiment, the system reverts the account to the neutral color (e.g. medium green) and then changes it to light green and shows the second withdrawal in the same manner as above, with a single cut-out or indicator.

All of the features described previously apply to this application of the system as well. For example, the user can mouse over or right-click on the display to have messages appear in their full form, or to add or change the presence or status of participants.

Document Tracking

Figure 18:
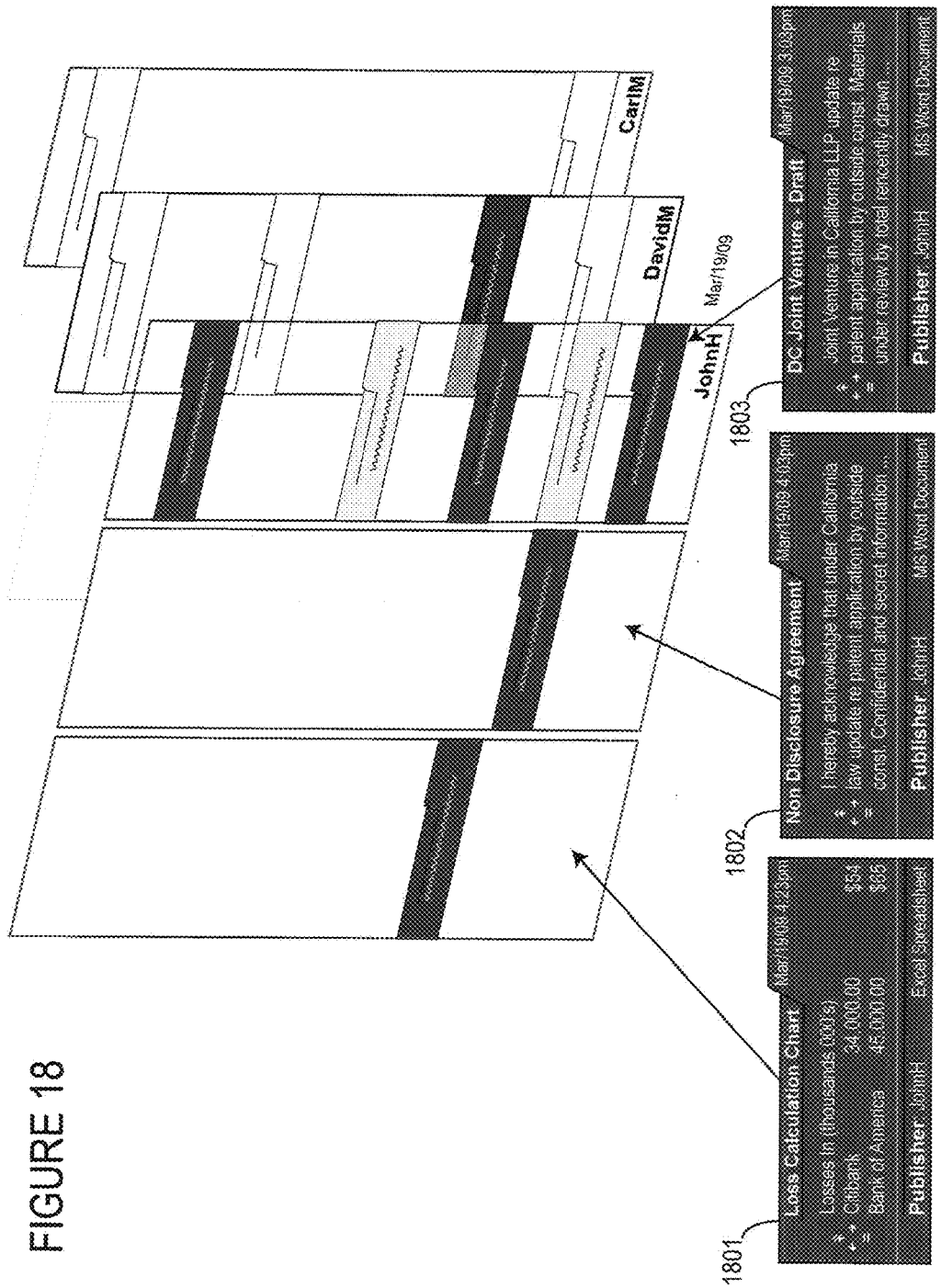
FIG. 18 illustrates document tracking in an embodiment of the system.

The system also capable of providing a display for document tracking. FIG. 18 illustrates an embodiment of document tracking using the system. Three documents are represented by message icons 1801, 1802, and 1803. The visualization layer uses color coding for different versions and revisions of documents. The user can see who received the document, who revised it and when, latest and earlier versions, etc.

Embodiment of Computer Execution Environment (Hardware)

Figure 19:
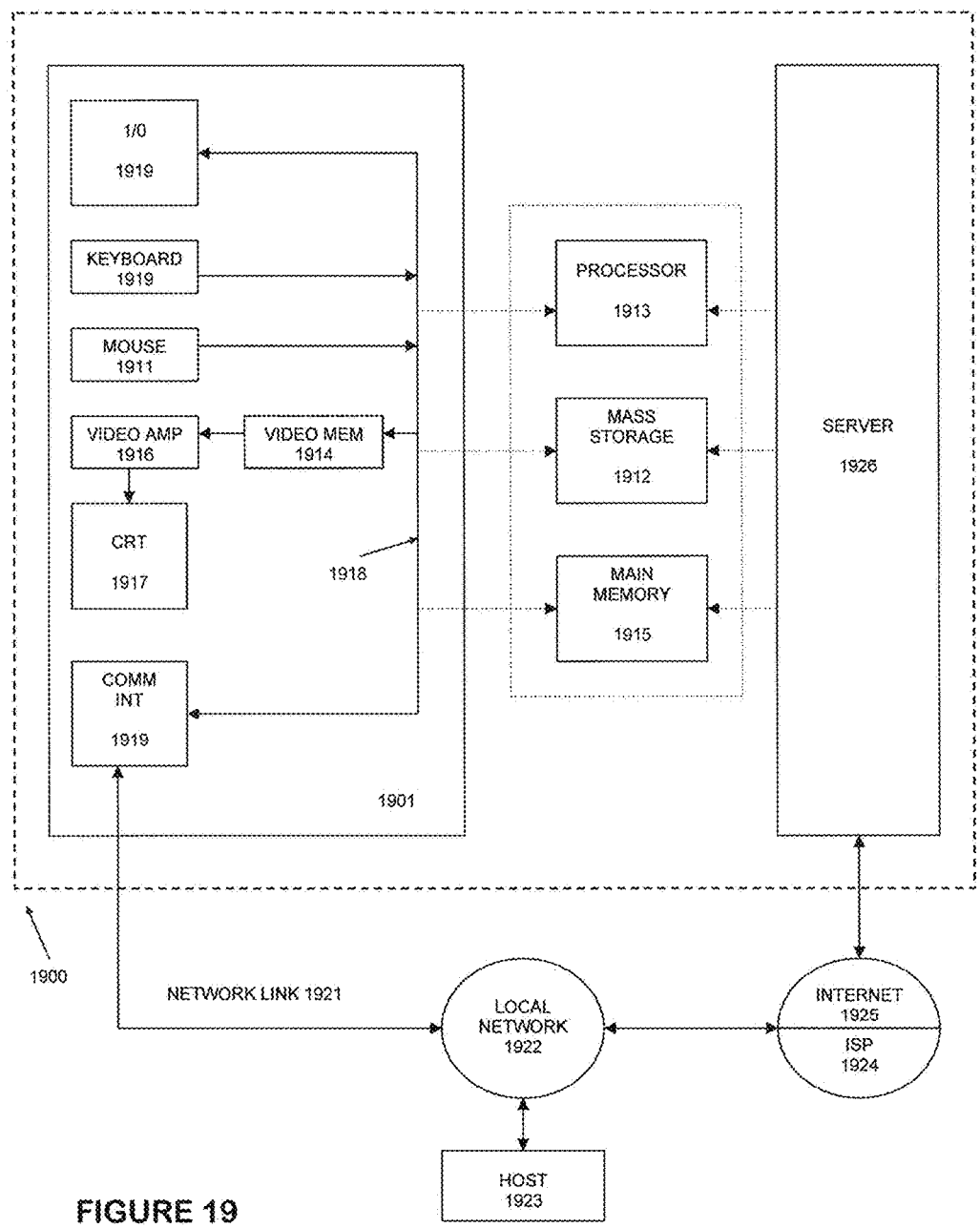
FIG. 19 is an example computer system in one embodiment.

An embodiment of the system can be implemented as computer software in the form of computer readable program code executed in a general purpose computing environment such as environment 1900 illustrated in FIG. 19, or in the form of bytecode class files executable within a within a Java™ or other virtual machine run time environment running in such an environment, or in the form of bytecodes running in such an environment, or in the form of bytecodes running on a processor (or devices enabled to process bytecodes) existing in a distributed environment (e.g., one or more processors on a network). A keyboard 1910 and mouse 1911 are coupled to a system bus 1918. The keyboard and mouse are for introducing user input to the computer system and communicating that user input to central processing unit (CPU 1913. Other suitable input devices may be used in addition to, or in place of, the mouse 1911 and keyboard 1910, such as a tablet PC, iPad, touchscreen device, smartphone/PDA, etc. I/O (input/output) unit 1919 coupled to bi-directional system bus 1918 represents such I/O elements as a printer, A/V (audio/video) I/O, etc.

Computer 1901 may include a communication interface 1920 coupled to bus 1918. Communication interface 1920 provides a two-way data communication coupling via a network link 1921 to a local network 1922. For example, if communication interface 1920 is an integrated services digital network (ISDN) card or a modem, communication interface 1920 provides a data communication connection to the corresponding type of telephone line, which comprises part of network link 1921. If communication interface 1920 is a local area network (LAN) card, communication interface 1920 provides a data communication connection via network link 1921 to a compatible LAN. Wireless links are also possible. In any such implementation, communication interface 1920 sends and receives electrical, electromagnetic or optical signals which carry digital data streams representing various types of information.

Network link 1921 typically provides data communication through one or more networks to other data devices. For example, network link 1921 may provide a connection through local network 1922 to local server computer 1923 or to data equipment operated by ISP 1924. ISP 1924 in turn provides data communication services through the world wide packet data communication network now commonly referred to as the "Internet" 1925. Local network 1922 and Internet 1925 both use electrical, electromagnetic or optical signals which carry digital data streams. The signals through the various networks and the signals on network link 1921 and through communication interface 1920, which carry the digital data to and from computer 1901, are exemplary forms of carrier waves transporting the information.

Processor 1913 may reside wholly on client computer 1901 or wholly on server 1926 or processor 1913 may have its computational power distributed between computer 1901 and server 1926. Server 1926 symbolically is represented in FIG. 19 as one unit, but server 1926 can also be distributed between multiple "tiers". In one embodiment, server 1926 comprises a middle and back tier where application logic executes in the middle tier and persistent data is obtained in the back tier. In the case where processor 1913 resides wholly on server 1926, the results of the computations performed by processor 1913 are transmitted to computer 1901 via Internet 1925, Internet Service Provider (ISP) 1924, local network 1922 and communication interface 1920. In this way, computer 1901 is able to display the results of the computation to a user in the form of output.

Computer 1901 includes a video memory 1914, main memory 1915 and mass storage 1912, all coupled to bi-directional system bus 1918 along with keyboard 1910, mouse 1911 and processor 1913.

As with processor 1913, in various computing environments, main memory 1915 and mass storage 1912, can reside wholly on server 1926 or computer 1901, or they may be distributed between the two. Examples of systems where processor 1913, main memory 1915, and mass storage 1912 are distributed between computer 1901 and server 1926 include thin-client computing architectures and other personal digital assistants, Internet ready cellular phones and other Internet computing devices, and in platform independent computing environments, The mass storage 1912 may include both fixed and removable media, such as magnetic, optical or magnetic optical storage systems or any other available mass storage technology. The mass storage may be implemented as a RAID array or any other suitable storage means. Bus 1918 may contain, for example, thirty-two address lines for addressing video memory 1914 or main memory 1915. The system bus 1918 also includes, for example, a 32-bit data bus for transferring data between and among the components, such as processor 1913, main memory 1915, video memory 1914 and mass storage 1912. Alternatively, multiplex data/address lines may be used instead of separate data and address lines.

In one embodiment of the invention, the processor 1913 is a microprocessor such as manufactured by Intel, AMD, Sun, etc. However, any other suitable microprocessor or microcomputer may be utilized. Main memory 1915 is comprised of dynamic random access memory (DRAM). Video memory 1914 is a dual-ported video random access memory. One port of the video memory 1914 is coupled to video amplifier 1916. The video amplifier 1916 is used to drive the cathode ray tube (CRT) raster monitor 1917. Video amplifier 1916 is well known in the art and may be implemented by any suitable apparatus. This circuitry converts pixel data stored in video memory 1914 to a raster signal suitable for use by monitor 1917. Monitor 1917 is a type of monitor suitable for displaying graphic images, such as computer monitor, tablet PC, iPad, smartphone/PDA, touchscreen device, etc Computer 1901 can send messages and receive data, including program code, through the network(s), network link 1921, and communication interface 1920. In the Internet example, remote server computer 1926 might transmit a requested code for an application program through Internet 1925, ISP 1924, local network 1922 and communication interface 1920. 'The received code maybe executed by processor 1913 as it is received, and/or stored in mass storage 1912, or other non-volatile storage for later execution. In this manner, computer 1901 may obtain application code in the form of a carrier wave. Alternatively, remote server computer 1926 may execute applications using processor 1913, and utilize mass storage 1912, and/or video memory 1915. The results of the execution at server 1926 are then transmitted through Internet 1925, ISP 1924, local network 1922 and communication interface 1920. In this example, computer 1901 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment, such as tablet PC, iPad, touchscreen device, PDA, etc.

Thus, a system for analyzing and displaying relationships between communications and transactions has been described.

What is claimed is:

1. A non-transitory machine-readable storage medium encoded with instructions executable by a processor of a computing device, the non-transitory machine-readable storage medium comprising instructions to:

produce a map to electronically stored information by displaying the relationships of messages or transactions in a thread, wherein displaying the relationships of messages or transactions in the thread comprises:

displaying, in a first dimension, one or more areas respectively associated with one or more participants, wherein the one or more participants include:

a root originator represented using a first graphical attribute other than text;

an active participant represented using a second graphical attribute that is different than said first graphical attribute;

and a passive participant represented using a third graphical attribute that is different from each of said first graphical attribute and said second graphical attribute;

displaying, in a second dimension, in the area intersecting the root originator in the first dimension, a representation of a root message or transaction generated by the root originator, wherein the root message or transaction is associated with one or more first related participants of the one or more participants;

concurrently displaying, in each of the one or more areas associated with the one or more first related participants, a representation of the root message or transaction;

concurrently displaying, in the second dimension, in the area intersecting a responder participant of the one or more first related participants, a representation of a responsive message or transaction generated by the responder participant, wherein the responsive message or transaction is responsive to the root message or transaction, and wherein the responsive message or transaction is associated with one or more second related participants of the one or more participants;

concurrently displaying, in each of the one or more areas associated with the one or more second related participants, a representation of the responsive message or transaction, wherein a profile builder identifies any aliases of the one or more second related participants and a conversation builder analyzes documents to determine if they are part of the thread; and displaying, in a third dimension, a time associated with the root message or transaction and a time associated with the responsive message or transaction, wherein the first dimension, second dimension, and third dimension are dimensions of a cube-shaped representation of the thread.

2. The non-transitory machine-readable storage medium of claim 1, wherein a message or transaction is associated with a participant if the message or transaction was received by, received via a cc by, received via bcc by or received via forward by the participant.

3. The non-transitory machine-readable storage medium of claim 1, wherein color coding is used to indicate one or more of the following:
the representation of the root message or transaction;
how the first related participants are associated with the root message or transaction;
the representation of the responsive message or transaction; and
how the second related participants are associated with the responsive message or transaction.

4. The non-transitory machine-readable storage medium of claim 1, wherein the representations of the root message/transaction and the responsive message/transaction each include a preview of the respective message or transaction, wherein each preview shows a portion of the associated message or transaction.

5. The non-transitory machine-readable storage medium of claim 1, wherein each of the one or more areas respectively associated with one or more participants is a column.

6. The non-transitory machine-readable storage medium of claim 5, wherein the representations of the root message/transaction and the representations of the responsive message/transaction are located within the associated columns such that the order of the messages/transactions in time is displayed.

7. The non-transitory machine-readable storage medium of claim 6, wherein the order of the messages/transactions in time is displayed by displaying representations of messages/transactions that are more recent in time closer to the top of the associated columns.

8. The non-transitory machine-readable storage medium of claim 4, wherein each preview shows one or more of the following: the recipient of the message or transaction, how the recipient of the message or transaction is associated with the message or transaction, the participant that generated the message or transaction, the date and time the message or transaction was sent, the subject of the message or transaction and a preview of the body of the message or transaction.

9. The non-transitory machine-readable storage medium of claim 4, wherein each preview displays an expansion button, wherein the expansion button is adapted to allow a user to expand the message preview to display more text of the associated message or transaction.

10. The non-transitory machine-readable storage medium of claim 4, wherein each preview displays a navigation tool, wherein the navigation tool is adapted to allow a user to display messages or transactions within the thread that are related to the message or transaction associated with the preview.

11. The non-transitory machine-readable storage medium of claim 4, wherein each preview displays a navigation tool, wherein the navigation tool is adapted to allow a user to move to a different message or transaction in the thread and/or move to a different thread.

12. A non-transitory machine-readable storage medium encoded with instructions executable by a processor of a computing device, the non-transitory machine-readable storage medium comprising instructions to:
produce a map to electronically stored information by displaying the relationships of messages or transactions in a thread, wherein displaying the relationships of messages or transactions in the thread comprises:
displaying, in a first dimension, a first column associated with a root participant;
displaying a representation of the root participant using a first graphical attribute other than text;
displaying, in the first dimension, one or more second columns associated respectively with non-root participants, the non-root participants including an active participant and a passive participant;
displaying a representation of the active participant using a second graphical attribute different than the first graphical attribute, wherein a profile builder identifies any aliases of the active participant;
displaying a representation of the passive participant using a third graphical attribute different from both the first graphical attribute and the second graphical attribute;
displaying a first preview of a root message in the first column, wherein the root message was sent by the root participant, wherein the root message is a root of the thread and a conversation builder analyzes documents to determine if they are part of the thread;
for each non-root participant, displaying, in a second dimension, a second preview of the root message in the associated second column if the non-root participant is an intended recipient of the root message, wherein each of the previews shows a portion of the associated message or transaction; and
displaying, in a third dimension, a time associated with the root message and a time associated with a responsive message, wherein the first dimension, second dimension, and third dimension are dimensions of a cube-shaped representation of the thread.

13. The non-transitory machine-readable storage medium of claim 12, wherein displaying the relationships of messages or transactions in the thread comprises:
displaying, in the second dimension, a plurality of rows associated with the first column and the second columns, wherein the first preview and the second previews of the root message are displayed in a first row of the plurality of rows; and
displaying previews of subsequent messages in the same thread, wherein the previews of each subsequent message are displayed in a different row of the plurality of rows.

14. The non-transitory machine-readable storage medium of claim 13, wherein each of the previews of messages is shaped substantially like a rectangle box, and wherein the rectangle box is displayed in the appropriate column and row according to the associated message and participant.

15. The non-transitory machine-readable storage medium of claim 14, wherein each rectangular box is displayed in a color that indicates how the message or transaction is associated with the participant.

16. The non-transitory machine-readable storage medium of claim 13, wherein each of the previews of messages displays a navigation tool, wherein the navigation tool is adapted to allow a user to display related messages within the thread.

17. The non-transitory machine-readable storage medium of claim 13, wherein each of the previews of messages displays a navigation tool, wherein the navigation tool is adapted to allow a user to move to a different message in the thread and/or move to a different thread.

18. The non-transitory machine-readable storage medium of claim 13, wherein displaying the relationships of messages or transactions in the thread comprises copying or linking one or more of the previews of messages to a clipboard for later retrieval.

19. The non-transitory machine-readable storage medium of claim 1, wherein said first graphical attribute is a first color, said second graphical attribute is a second color, and said third graphical attribute is a third color.

20. The non-transitory machine-readable storage medium of claim 12, wherein said first graphical attribute is a first color, said second graphical attribute is a second color, and said third graphical attribute is a third color.

* * * * *